(12) United States Patent
Kudou

(10) Patent No.: US 7,375,765 B2
(45) Date of Patent: May 20, 2008

(54) FALSE-POSITIVE DETECTION PREVENTION CIRCUIT FOR PREVENTING FALSE-POSITIVE DETECTION OF SIGNALS ON WHICH ABNORMAL SIGNALS ARE SUPERIMPOSED

(75) Inventor: Takashi Kudou, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 625 days.

(21) Appl. No.: 11/070,185

(22) Filed: Mar. 3, 2005

(65) Prior Publication Data

US 2005/0195326 A1    Sep. 8, 2005

(30) Foreign Application Priority Data

Mar. 4, 2004    (JP)    ............................. 2004-061100

(51) Int. Cl.
*H04N 7/00*    (2006.01)
(52) U.S. Cl. ..................... 348/465; 348/466
(58) Field of Classification Search ............... 348/465, 348/25, 466; 714/48, 699, 701, 746, 754; *H04N 7/00, H04N 11/00*
See application file for complete search history.

(56) References Cited

U.S. PATENT DOCUMENTS 6,839,055 B1 *   1/2005   Nguyen ..................... 348/466
7,098,960 B2 *   8/2006   Suzuki et al. ............... 348/465
7,134,064 B2 *   11/2006  Kim .......................... 348/466

FOREIGN PATENT DOCUMENTS

JP    11-32308       2/1999
JP    2000-197016    7/2000

\* cited by examiner

*Primary Examiner*—Sherrie Hsia
(74) *Attorney, Agent, or Firm*—McGinn IP Law Group, PLLC

(57) ABSTRACT

The false-positive detection prevention circuit inputs a multiplexed signal-sliced binary determination value, has an identification code detection circuit for detecting the identification code of the binary determination value and evaluating the identification code, carries out error determination for the identification code evaluation, and outputs a signal that does not correspond to the signal as an error signal. The identification code evaluation carried out by the identification code detection circuit makes reference to the width of the pulse of the binary determination value related to the identification code.

30 Claims, 28 Drawing Sheets

FALSE-POSITIVE DETECTION PREVENTION CIRCUIT FOR PREVENTING FALSE-POSITIVE DETECTION OF SIGNALS ON WHICH ABNORMAL SIGNALS ARE SUPERIMPOSED

BACKGROUND OF THE INVENTION

1. Field of the Invention

The present invention is related to a false-positive detection prevention circuit for preventing false-positive detection where an abnormal signal, such as one comprising a lot of noise, or one that penetrates a transmission from an outside source, is superimposed on a multiplexed signal (an image signal, control signal or the like), and the resulting signal is detected as a normal signal, and more particularly, to a false-positive detection prevention circuit for preventing the false-positive detection of a Vertical Blanking Interval (VBI) signal.

2. Description of Related Art

When an image signal receiver like a television set displays images, an additional service incidental to image display, such as a character-multiplexed broadcast or data-multiplexed broadcast, can be provided by receiving not only image signals related to the image display, but also multiplexed signals, whereby additional signals such as characters, symbols and control signals are superimposed on the image signals.

A series of additional signals for realizing such an additional service exists in the vertical blanking interval (VBI) In the NTSC system utilized in television broadcasting in the United States and Japan, 525 scanning lines are provided in image signals, and of these 525 lines, a timing corresponding to the first 21 lines of each field is allocated for use as an interval for commencing scanning. This interval is called the VBI, and the characters, symbols, control signals and other such additional signals that exist in the VBI are called VBI signals. Typical VBI signals are VBID signals and closed-captioning signals. The waveforms of a VBID signal and closed-captioning signal are shown in FIG. 24 and FIG. 25, respectively.

The VBID signal shown in FIG. 24 is a bit array signal with a start code of "10," and is an NRZ (non-return to zero) format signal characterized by a fixed data period in the start code and data region.

The closed captioning signal shown in FIG. 25 is a bit array with a start code of "001," and is a signal that has a 16-bit data region. Before the start code, there is a clock run-in signal comprising pulses that are repeated a predetermined number of times at a fixed period.

An image signal receiver carries out image display and character output resulting from a multiplexed broadcast by reading the data in the VBI signal synchronized with a vertical synchronization signal and a horizontal synchronization signal in the image signal. However, a displayed image becomes distorted when the state of an airwave deteriorates, an image signal degrades due to an increase in noise, or a foreign signal enters from outside.

In particular, when noise increases in the VBI, this gives rise to such problems as the VBI signal deteriorating, and displayed characters and symbols either becoming distorted or garbled. Accordingly, control is implemented for solving problems like these by detecting either deteriorating VBI signals or unrelated signals that penetrate from outside as error signals, and not displaying the abnormal data of the data region.

Due to false detection that falsely detects an error signal as a VBI signal, a case that displays characters, symbols and so on which are not supposed to be displayed occurs. Technology development related to false-positive detection prevention is being carried out for preventing the occurrence of such cases.

FIG. 26 shows a block diagram of a conventional false-positive detection prevention circuit for preventing false-positive detections. In the conventional false-positive detection prevention circuit, slice timing set in accordance with a slice timing setting circuit 5 is used as a sampling clock for VBI signal slices, and this sampling clock determines the sampling position.

In a first method for setting slice timing, based on a horizontal synchronization signal obtained by synchronization separation from an input video signal, a slice timing setting circuit 5 sets slice timing by capturing horizontal synchronization timing and setting a constant frequency. Further, in a second method, a phase locked loop (PLL) 4 sets slice timing by frequency/phase synchronizing it to a clock run-in signal based on a clock run-in time pulse output by a synchronization separation circuit 3. Furthermore, the PLL 4 is only used when a clock run-in signal is included in a signal.

In the meantime, noise is removed from the input video signal by an LPF (low pass filter) 1, and a binary determination value is output from a comparator 2 based on a slice level set from outside.

A sampling hold circuit 6 receives a binary determination value and a signal for setting slice timing, and outputs slice data, which is a VBI signal sliced in accordance with a slice level.

A start code detection circuit 10 receives slice data from the sampling hold circuit 6. The start code detection circuit 10 carries out sampling for the received slice data in accordance with slice timing, determines whether or not a slice value at a sampling position coincides with the value of the start code (framing code), and outputs the results. When the start code detection circuit 10 determines that a slice value does not coincide with the start code value, it outputs an error signal. When an error signal is output from the start code detection circuit 10, control is implemented such that a display corresponding to the input video signal is not carried out, thus preventing a false-positive detection.

However, such conventional false-positive detection prevention method is not effective since there is a strong likelihood that a false-positive detection will occur when evaluating a start code based solely on a slice determination for a VBI signal at a sampling position.

For example, even in a case where a VBI signal is not superimposed on the video signal and a random signal is input, when a waveform that coincides with a start code is randomly detected at a sampling position due to the effects of noise, a determination is made that a VBI signal exists, causing a malfunction. In other words, when an abnormal pulse where a plurality of data change-points exist is inputted between one sampling position and the next sampling position in the VBI, it is mistakenly determined as a normal pulse signal since this determination is made based solely on the interval of a VBI-signal-slicing sampling clock and as such is not capable of detecting these change-points.

FIG. 27A shows the results of implementing false-positive detection prevention in a conventional false-positive detection prevention circuit. FIG. 27A shows a case where a VBID signal has been input as a VBI signal. As shown in the figure, a binary determination value is output in accordance with a set slice level. Sampling positions are determined in accordance with slice timing of a horizontal synchronization signal. Since the sampling interval is the same as the data period, the slice determination result of the slice data is favorable in that it shows the slice value of a VBI signal.

FIG. 27B shows a case where a VBI signal, which comprises a lot of noise and should be determined to be an error signal, is input. Similar to the case in FIG. 27A, binary determination values and sampling positions are determined, but change-points in binary determination values exist between a certain sampling position and an adjacent sampling position. In the conventional method, since a determination of "1" or "0" is only carried out for a binary determination value at either the rising edge or falling edge of the sampling clock, the above-mentioned change-points cannot be detected and the slice determination result becomes the same as the case in FIG. 27A. Thus, the VBI signal is not determined to be an error signal, and false-positive detection occurs. Moreover, if start code coincidence alone is evaluated as in the conventional method, the evaluation area will become even narrower, and the ratio of false-positive detections will become larger.

Techniques related to false-positive detection prevention have been disclosed for methods other than those described hereinabove, and typical such techniques will be explained.

In Japanese Unexamined Patent Publication No. 2000-197016, a data extraction circuit for reproducing character data such as closed captions and text data generates a horizontal synchronization signal-synchronized clock signal for data extraction such that character data can be stably reproduced despite picture signal deterioration and frequency fluctuations. Then, the number of cycle of a clock run-in signal is detected on the basis of the data extraction clock signal, and for start bit detection, a determination is made as to whether or not a VBI signal should be detected by comparing a VBI signal with a reference value.

However, in detecting only the number of cycles of a run-in clock, even when a signal that does not coincide with the period of a detected VBI signal is input, when the cycle number is the same as the cycle number of a detected VBI signal, it may be determined that a clock run-in signal exists and there is a VBI signal to be detected. Further, with regard to start bit detection, the problem is that since comparison is made with a reference value, a false signal with a degree of coincidence approaching the threshold value is detected as a false positive.

Japanese Unexamined Patent Publication No. 11-32308 discloses a conventional method where an abnormal determination is made by comparing a horizontal synchronization signal with an HD signal, the period of which is more orderly than that of the horizontal synchronization signal in order to prevent erroneous data from being output as extraction data when distorted multiplexed signals are input.

However, when the horizontal synchronization signal is normal, and a signal other than a detected VBI signal is input, there is a high likelihood of a false-positive detection occurring since an abnormal determination is not made.

In all of the techniques described hereinabove, a timing, value or signal constituting a reference is set for preventing false-positive detection, and then an evaluation for determining whether or not there is an error is carried out by comparing the set reference timing, value or signal against an input signal timing, value or signal. However, due to the fact that a VBI signal that intrinsically would trigger a false-positive detection resembles the timing, value or signal to be compared in the comparison-based evaluation method, there is an increased likelihood of a determination being made that indicates there is no error, resulting in a higher ratio of false-positive detections.

SUMMARY OF THE INVENTION

According to one aspect of the present invention, there is provided A false-positive detection prevention circuit comprising: an identification code detection circuit for detecting an identification code of a binary determination value generated by slicing a multiplexed signal, evaluating the identification code, and outputting the detection result; and error determination circuit for making a error determination based on the detection result; wherein the identification code evaluation makes reference to at least one of the parameters including a pulse width, a pulse period and initial edge position of the binary determination value related to the identification code.

According to another aspect of the present invention, there is provided a false-positive detection prevention circuit, which inputs a multiplexed signal-sliced binary determination value, has an identification code detection circuit for detecting the identification code of the binary determination value, and evaluating the identification code, carries out error determination for the identification code evaluation, and outputs a signal that does not correspond to the signal as an error signal, wherein the identification code evaluation carried out by the identification code detection circuit makes reference to at least one of the parameters including a pulse width, a pulse period and initial edge position of the binary determination value related to the identification code.

According to another aspect of the present invention, there is provided a false-positive detection prevention circuit, which inputs a multiplexed signal-sliced binary determination value, has an identification code detection circuit for detecting the identification code of the binary determination value, and evaluating the identification code, carries out error determination for the identification code evaluation, and outputs a signal that does not correspond to the signal as an error signal, wherein the identification code evaluation carried out by the identification code detection circuit makes reference to the rising/falling-edge position at which the binary determination value initially changes related to the identification code in each field.

The present invention establishes a fixed determination criterion for a VBI signal and other such multiplexed signals by referencing either the width or period of the pulse of a binary determination value. Then, by determining the signal that does not satisfy this determination criterion to be an error signal, the present invention makes it possible to increase the false-positive detection prevention ratio.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

An explanation related in particular to the prevention of a false-positive detection of a VBI signal, which is a video signal that exists in a VBI, will be given hereinbelow as the best mode for carrying out the present invention, while referring to the figures.

First Embodiment

Figure 1:
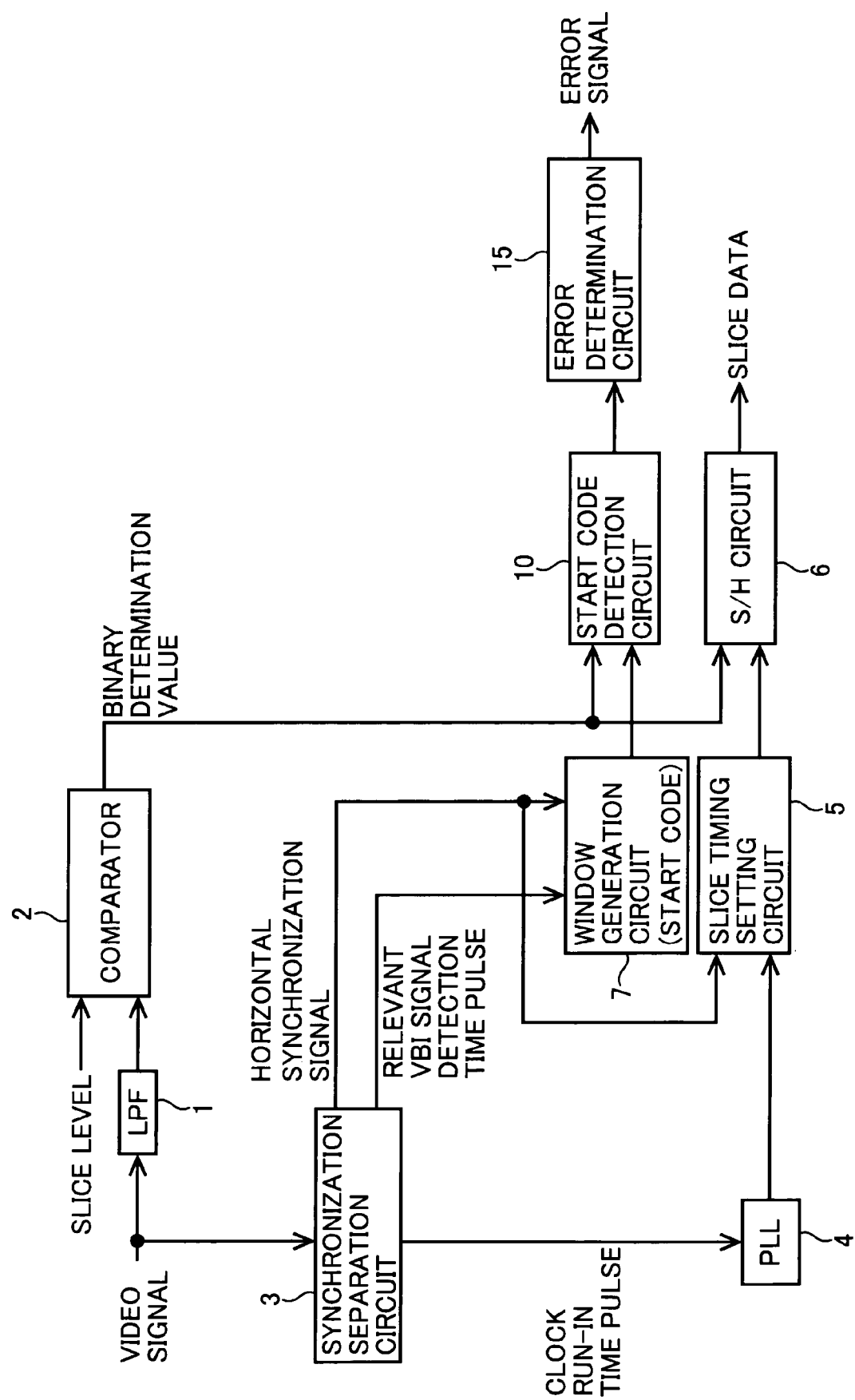
FIG. 1 is a block diagram of a false-positive detection prevention circuit of a first embodiment.

Firstly, the constitution of a false-positive detection prevention circuit of a first embodiment of the present invention is shown in FIG. 1. The false-positive detection prevention circuit of the first embodiment comprises an LPF 1, comparator 2, synchronization separation circuit 3, PLL 4, slice timing setting circuit 5, sampling hold circuit 6, window generation circuit 7, start code detection circuit 10, and error determination circuit 15.

The LPF 1 is a circuit having functions for removing noise by removing the high frequency components of an input video signal.

The comparator 2 is a circuit for inputting a video signal from which noise has been removed by the LPF 1, and slice levels input from outside, and comparing these and outputting a binary determination value. In setting the slice levels for the data region of a video signal, the comparator 2 can ensure that binary determination value is effective even for a small number of slice levels by setting a small slice level interval if the amplitude of the data in the data region is small, and setting a large interval if the amplitude is large.

Figure 2A:
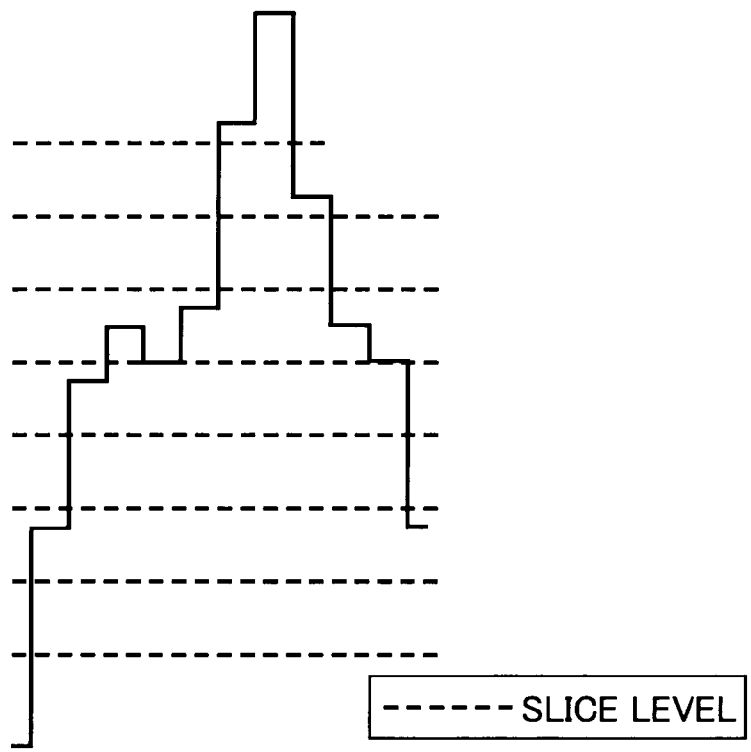
FIGS. 2A and 2B are diagrams related to the setting of slice level intervals for data in a data region.
Figure 2B:
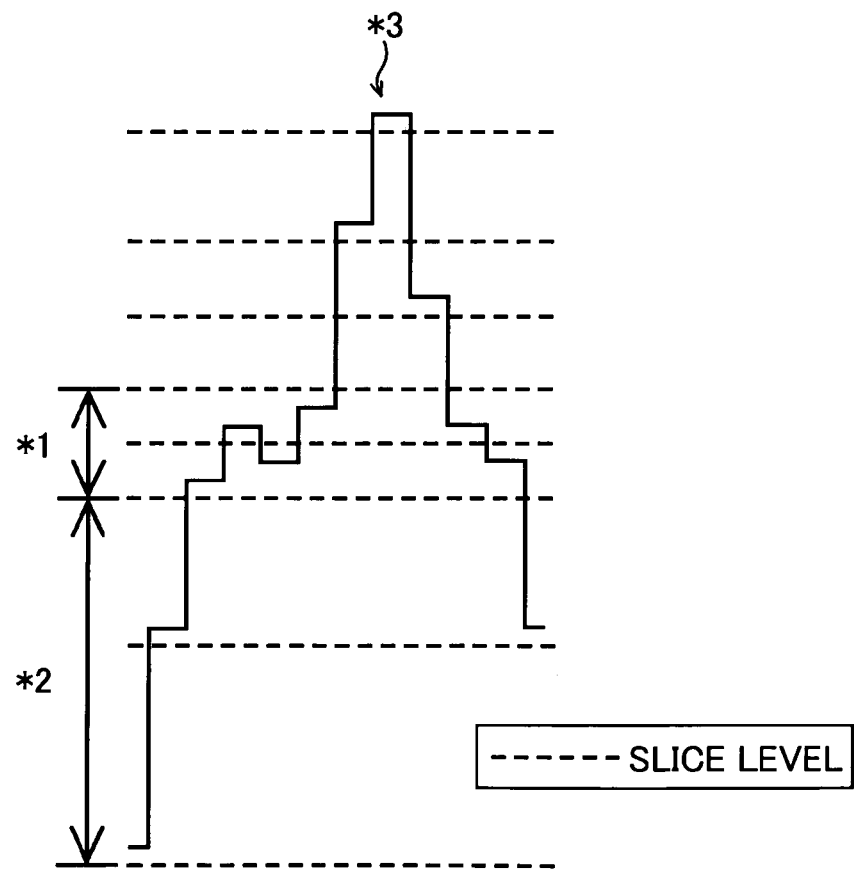

When the slice levels for slicing the data of the data region shown in FIG. 2 into eight levels is set at equal intervals as in FIG. 2A, it is not possible to cover the entire data amplitude. It also makes it impossible to set a number of slice levels in places with large amplitudes, or to set slice levels in places with small amplitudes. However, by varying the intervals of the slice levels as in FIG. 2B, the number of slice levels is set to be increased and the intervals is set to be reduced in the range of area *1 where the data amplitude is small. Also the number of slice levels is set to be decreased and the intervals is set to be enlarged in the range of area *2 where the data amplitude is large. As a result, it becomes possible to set slice levels even for an area having a large value such as *3, thus ensuring that binary determination value output is effective even for a small number of slice levels. In the present invention, the setting of the slice is not limited to this embodiment, and another method for setting of the slice may be employed.

The synchronization separation circuit 3 is a circuit for capturing synchronization timing by using either the horizontal synchronization signal or vertical synchronization signal of an input video signal as a reference. The synchronization separation circuit 3 related to this embodiment separates and outputs a horizontal synchronization signal from an input video signal, and, in addition, outputs a relevant VBI signal detection time pulse, which expresses the time period for detecting a VBI signal. Also, when a VBI signal comprising a clock run-in signal, such as a closed captioning signal, is inputted to the synchronization separation circuit 3, this synchronization separation circuit 3 outputs a clock run-in time pulse indicating a duration corresponding to a clock run-in signal. The PLL 4 is a circuit for generating an output signal with a frequency and phase that are locked to (do not deviate from) ant input video signal. The PLL 4 related to this embodiment is provided only when a clock run-in signal is contained in a VBI signal. Then, by inputting a clock run-in time pulse and synchronizing it to a clock run-in signal, the PLL 4 outputs a signal with the exact same frequency and phase as the clock run-in time pulse.

The slice timing setting circuit 5 receives a horizontal synchronization signal from the synchronization separation circuit 3, and the output signal from the PLL 4. The slice timing setting circuit 5 sets a slice timing for a sampling clock based on the input horizontal synchronization signal. Further, when a VBI signal comprises a clock run-in signal, the slice timing setting circuit 5 inputs the frequency and phase locked output signal from the PLL 4 and sets a slice timing based on this output signal.

The sampling hold circuit (S/H circuit) 6 is a circuit for outputting slice data, which is a VBI signal sliced on the basis of slice levels, in accordance with the binary determination value output from the comparator 2 and the slice timing set by the slice timing setting circuit 5. By sampling this slice data according to the slice timing, the slice value "1", "0" at a sampling position is determined, and a slice determination result is obtained.

The window generation circuit 7 is a circuit, which receives a horizontal synchronization signal and a relevant VBI signal detection time pulse from the synchronization separation circuit 3, and which generates a window for extracting the start code part of the relevant VBI signal. In other words, this window is set so as to comprise a time period where a start code exists, and is generated for detecting a start code by using a horizontal synchronization signal as a reference. Therefore, this process guarantees that pulses, which exist in a window for start code detection are a start code under normal circumstances, and are not another signal (clock run-in signal, data region).

Figure 3:
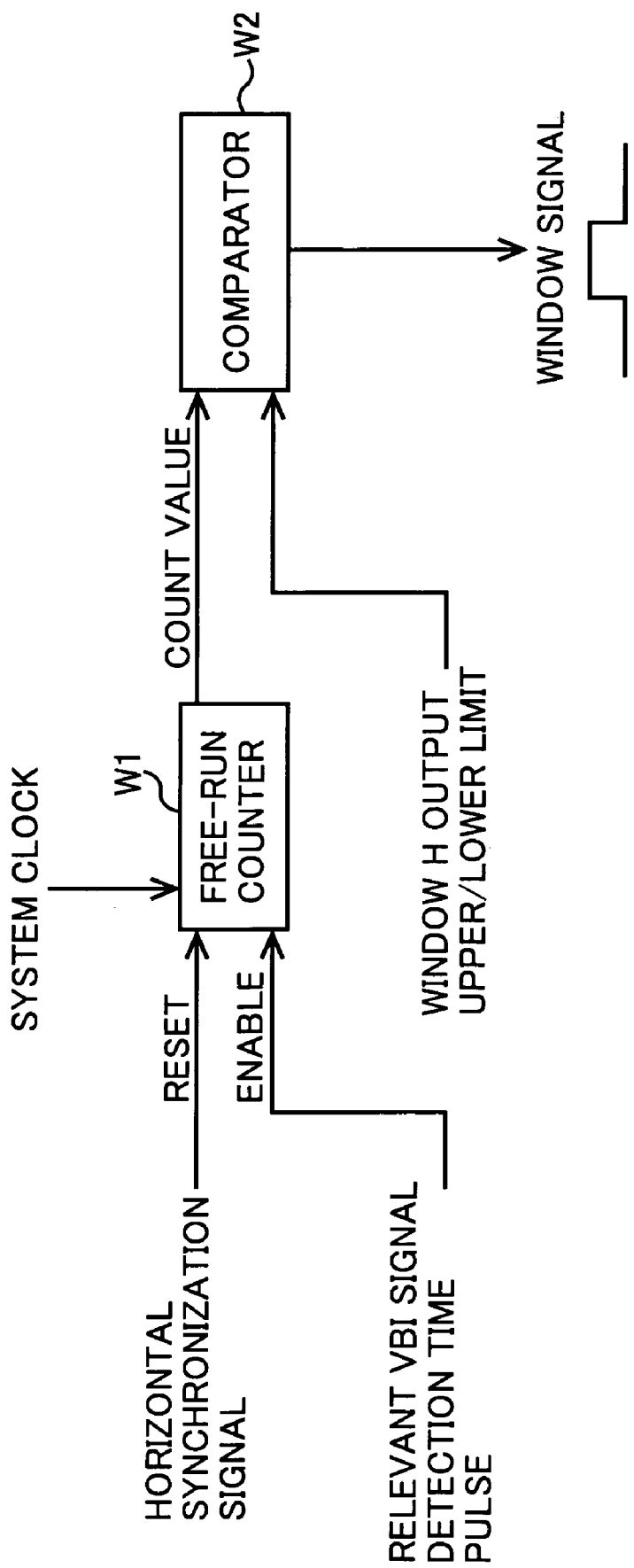
FIG. 3 is a block diagram of a window generation circuit.
Figure 4:
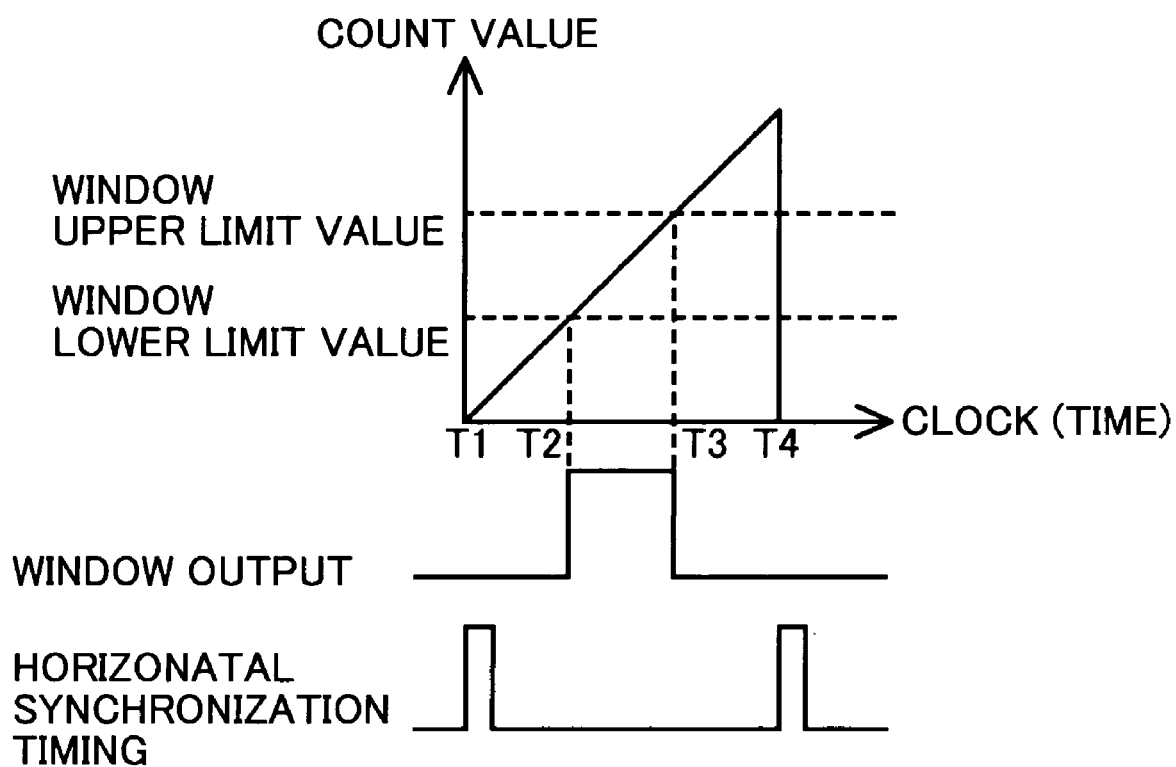
FIG. 4 is a graph of count values—number of clocks (or clock count values) in window output.

The operation whereby the window generation circuit 7 generates a window for detecting a start code will be explained in detail using FIGS. 3 and 4. FIG. 3 is a block diagram of a window generation circuit, and FIG. 4 is a graph of the count values—number of clocks (or clock count values) in a window output. A window generation circuit comprises a free-run counter W1 and a comparator W2, and outputs a window signal on the basis of a horizontal synchronization signal and a relevant VBI signal detection time pulse. In an output window signal, a window generation circuit outputs as high (H) during a time corresponding to a specific duration of a relevant VBI signal detection time period. The window generation circuit 7 has the same constitution, and an output window signal constitutes a window for start code detection. Furthermore, a window signal output by a window generation circuit 7 is not limited to start code use, as will be explained in detail further below.

Figure 5:
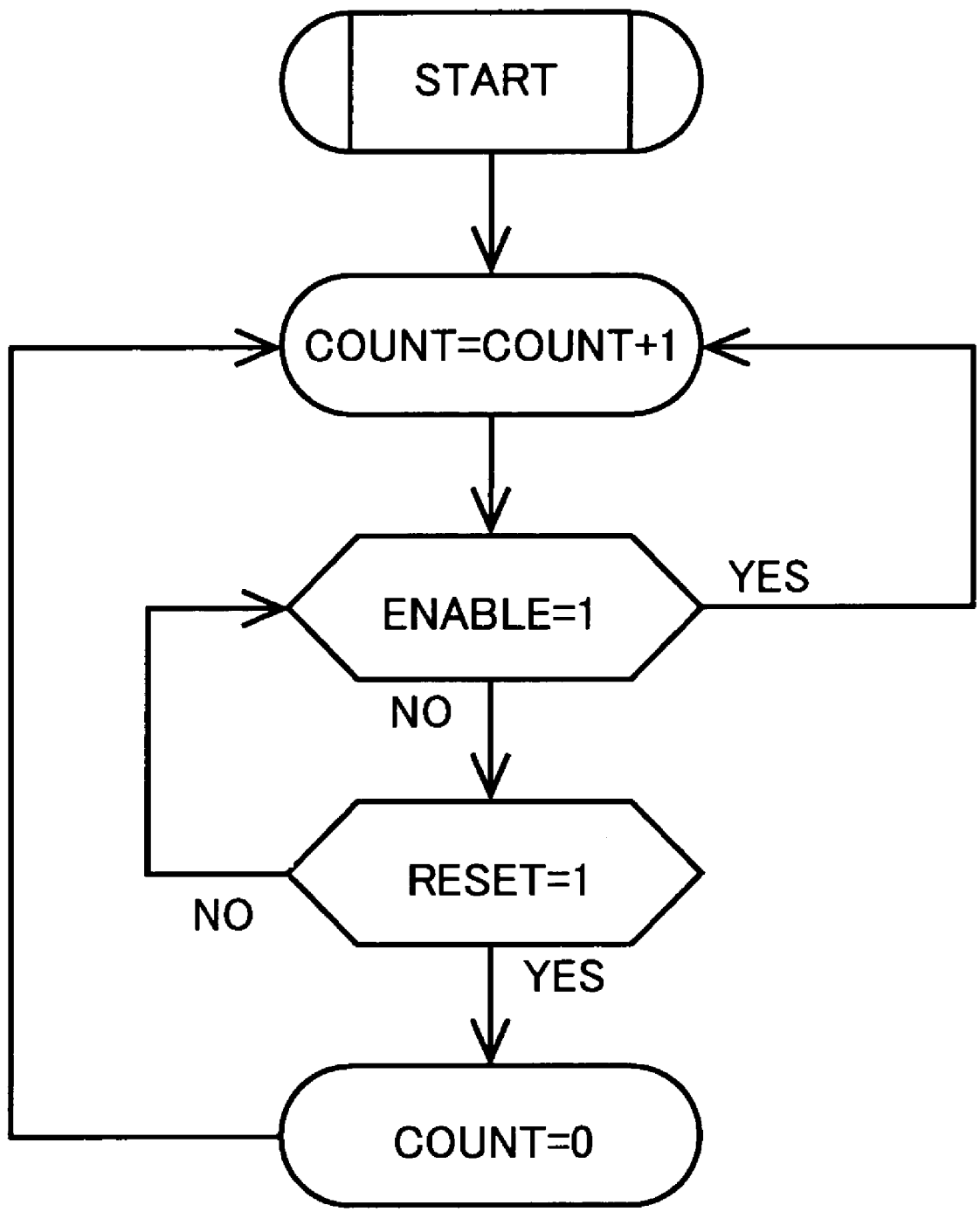
FIG. 5 is a flowchart representing the operation processing of a free-run counter.

The free-run counter W1 counts the detection time pulse of a relevant input VBI signal detection time pulse from T1 through T4 of FIG. 4 using the system clock as a reference, and outputs this count value. This count value is reset by horizontal synchronization timing (corresponding to T1, T4 of FIG. 4). Therefore, the detection time period of a VBI signal between horizontal synchronization signals is indicated by the count value which is output from the free-run counter W1. The above operating procedure is shown in the flowchart of FIG. 5.

The comparator W2 outputs a window signal relative to the input of upper limit/lower limit values and a count value for outputting a window signal as H. As shown in FIG. 4, by externally specifying a range for carrying out an H output of a window signal relative to a count value, the comparator W2 outputs a window signal that treats a detection time of a VBI signal corresponding to a count value within that range as an H output. The starting point of the H output is T2, and the ending point is T3. Furthermore, an H output of a window signal corresponding to a count value will be called a window H output. In the window generation circuit 7, setting the upper limit of a window H output at the ending point side of a start code, and setting the lower limit at the starting point side of a start code causes a window to be output as H in the range where a start code exists, generating a start code detection window.

In an output start code detection window, a margin can be added before and after the start code range. This is because when the width of the window is set too strictly, there is the possibility of an error signal determination being made even for a signal that essentially is a VBI signal. In order to achieve this margin, the setting can be made such that the range corresponding to the upper and lower limit values of the window H output become broader than the range of the start code.

The start code detection circuit 10 is a circuit, which receives a binary determination value output from the comparator 2 and a start code detection window output from the window generation circuit 7, and which determines the start code on the basis of these values and outputs the result of this determination. In making a start code determination, an evaluation of "0/1" binary determination value in a start code detection window, in other words, an evaluation of "0/1" in the start code is carried out. The evaluation method for this is one whereby the continuity of the binary determination value "0/1" is evaluated with reference to the system clock. The start code detection circuit 10 counts the binary determination value by using the system clock as a reference signal, and measures the time period during which a binary determination value of either "0" or "1" continues to be detected as a count value. When this continuity coincides with the start code pattern of a relevant VBI signal, the relevant VBI signal is determined to exist.

Figure 6:
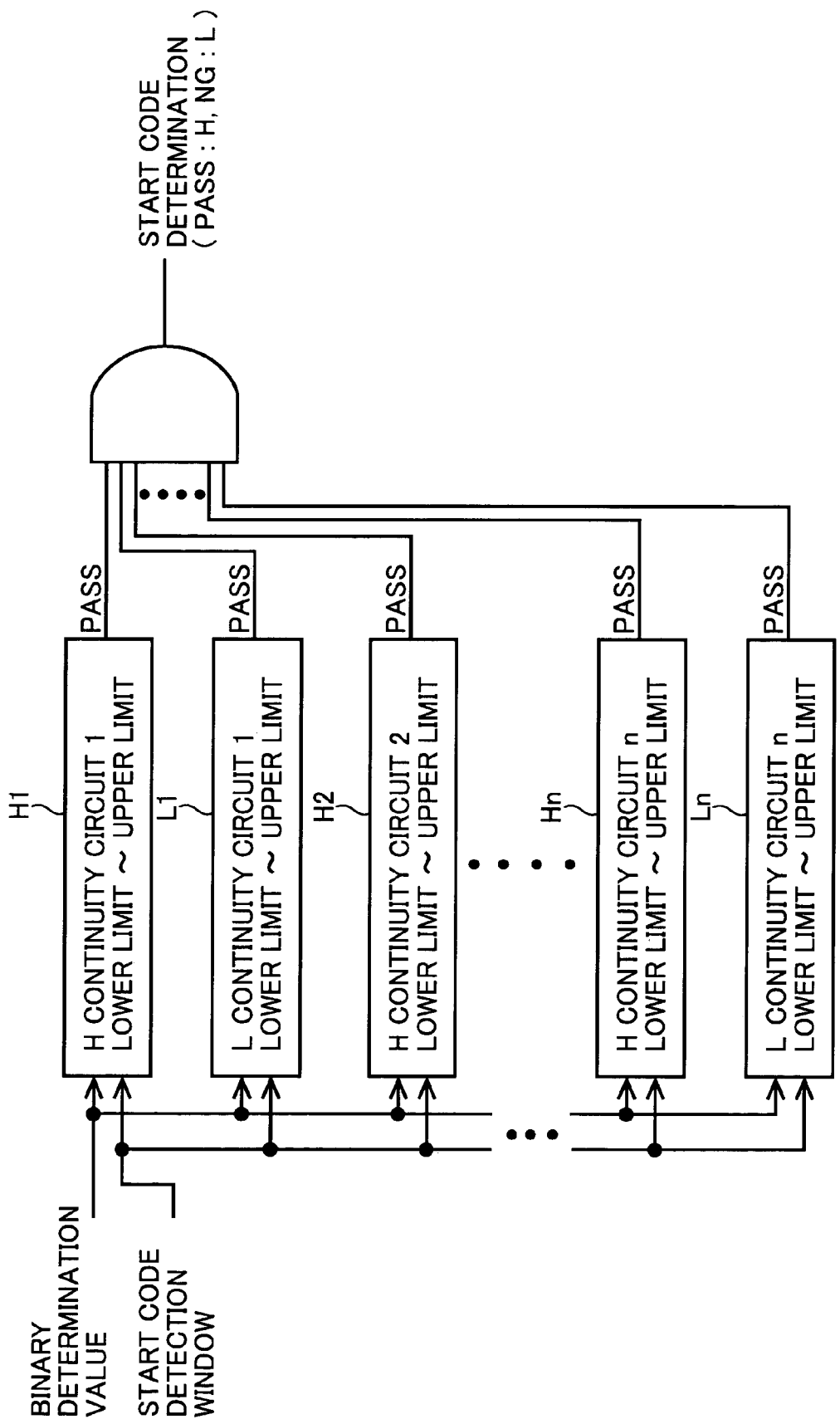
FIG. 6 is a block diagram of a start code detection circuit 10.
Figure 7:
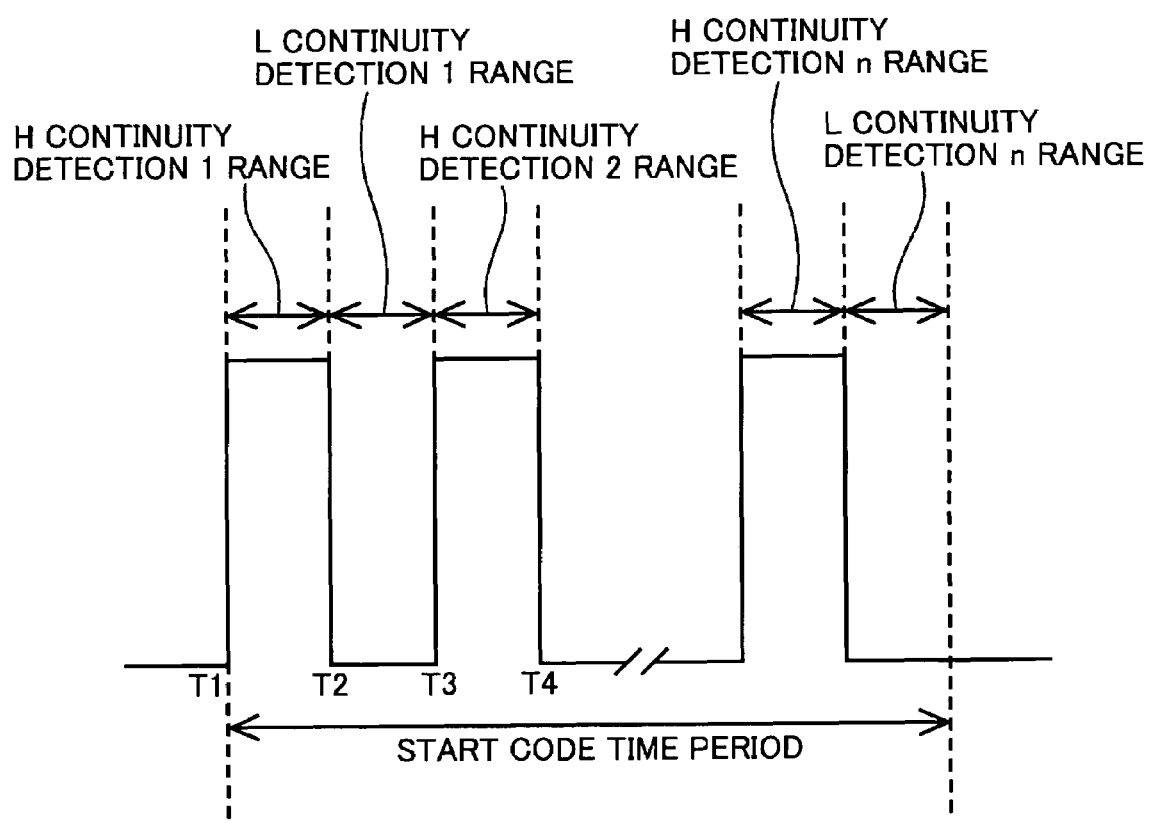
FIG. 7 illustrates a start code pulse in a window for start code detection.
Figure 8:
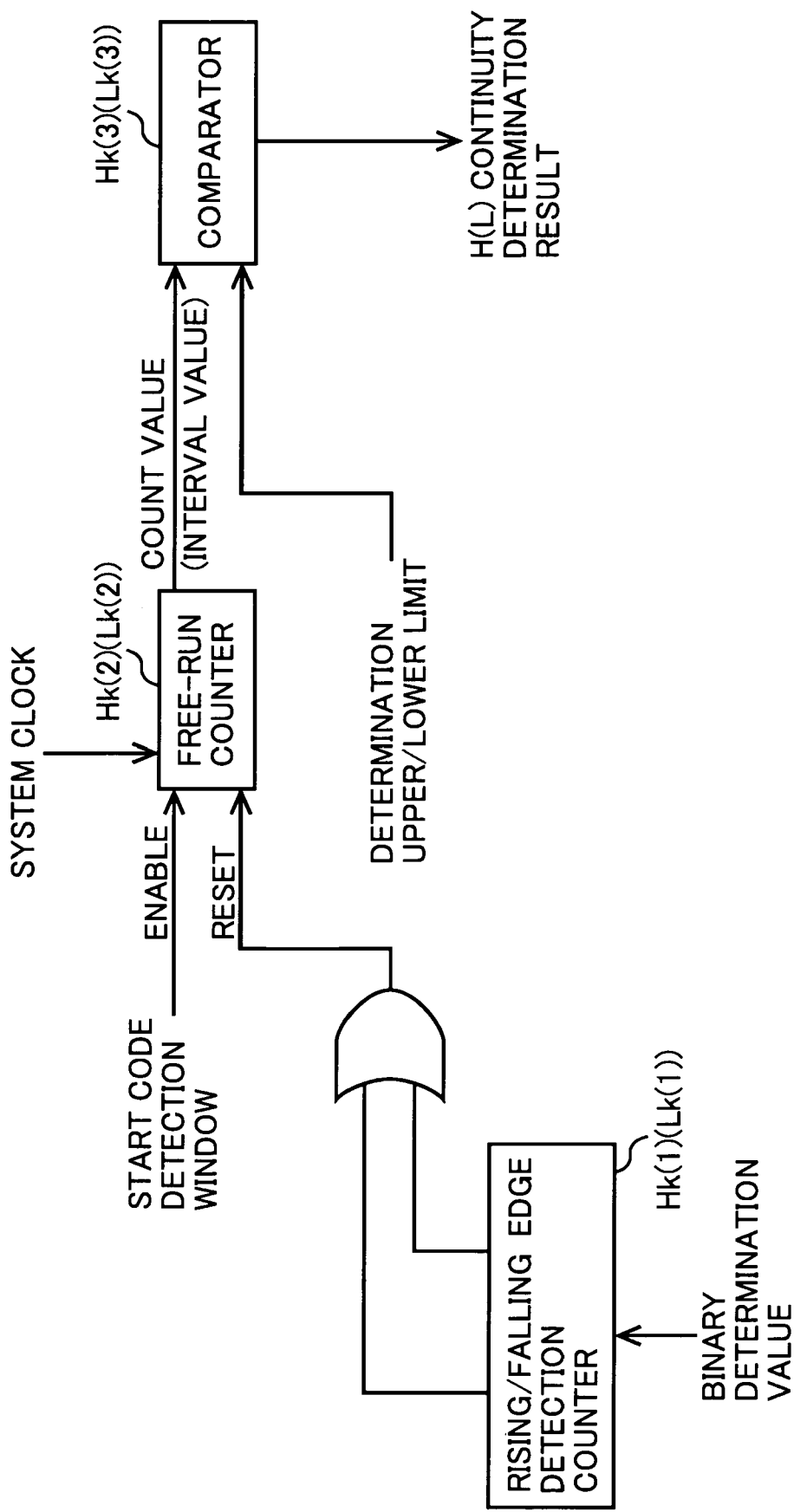
FIG. 8 is a block diagram of H (L) continuity detection k (Hk (Lk))
Figure 9:
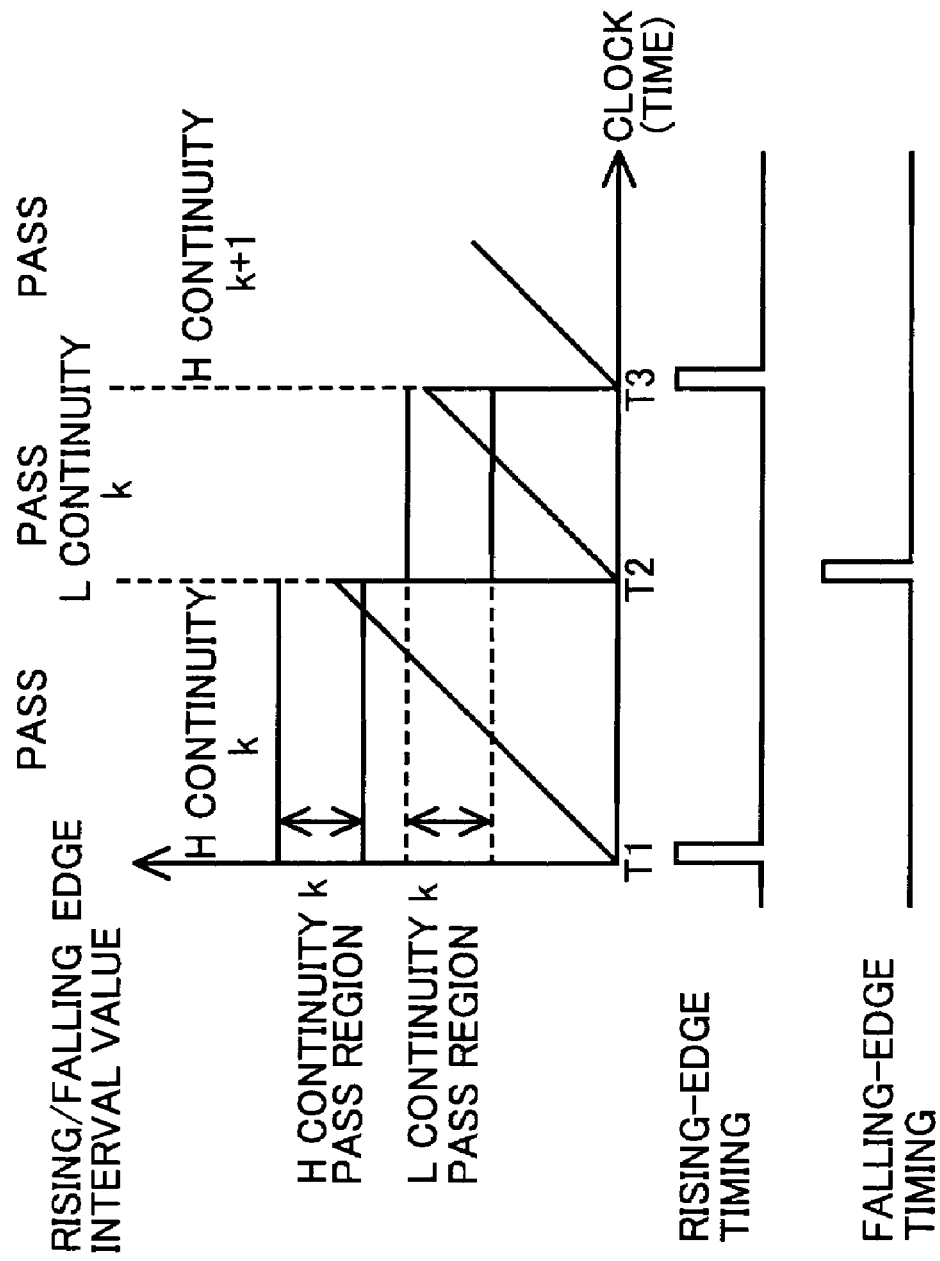
FIG. 9 is a graph of rising/falling-edge interval values—number of clocks (or clock count values) in an H (L) continuity determination result output.

The above-mentioned method for evaluating continuity of the binary determination value will be explained in detail using FIGS. 6 through 8. FIG. 6 shows a block diagram of the start code detection circuit 10, and FIG. 7 shows a pulse of a start code in a start code detection window. Also, FIG. 8 shows a block diagram of H (L) continuity detection circuit k (Hk (Lk)) in FIG. 6, and FIG. 9 shows a graph of rising/falling-edge interval values—number of clocks (or clock count values) in the H (L) continuity determination result output of FIG. 8.

As shown in FIG. 6, the start code detection circuit 10 comprises n H continuity detection circuits k (Hk), n L continuity detection circuits k (Lk) (k=1, 2, . . . n), and an AND circuit. In each continuity detection circuit, a binary determination value from the comparator 2 and a start code detection window from the window generation circuit 7 are input.

H continuity detection circuit 1 (H1) is a circuit for measuring the time period during which a determination of "1" corresponding to H level continues by a pulse in the H continuity detection 1 range (T1 through T2) within the start code time period where there is a start code as shown in FIG. 7. If the time period during which determinations of "1" continue is within a predetermined range, it is determined to be a normal start code in the H continuity detection 1 range, and PASS is output as the H continuity determination result.

L continuity detection circuit 1 (L1) is a circuit for measuring the time period during which a determination of "0" corresponding to L level continues by a pulse in the L continuity detection 1 range (T2 through T3) within the start code time period having a start code as shown in FIG. 7. If the time period during which determinations of "0" continue is within a predetermined range, it is determined to be a normal start code in the L continuity detection 1 range, and PASS is output as the L continuity determination result.

Similarly, the same processing is also performed hereinbelow in H (L) continuity detection circuit k (Hk (Lk)), and PASS is output. A start code determination is output for each PASS output from H (L) continuity detection circuit k (Hk (Lk)).

The operation by which H (L) continuity detection circuits k (Hk (Lk)) (k=1, 2, . . . ) outputs an H (L) continuity determination result based on a start code detection window and a binary determination value will be explained in detail using FIGS. 8 and 9. FIG. 8 is a block diagram of H (L) continuity detection circuits k (Hk (Lk)) (k=1, 2, . . . ), and FIG. 9 is a graph of rising/falling-edge interval values—number of clocks (or clock count values) in an H (L) continuity determination result output. H (L) continuity detection circuit k (Hk (Lk)) comprises a rising/falling-edge detection circuit Hk (1) (Lk (1)), a free-run counter Hk (2) (Lk (2)), and a comparator Hk (3) (Lk (3)).

Figure 10A:
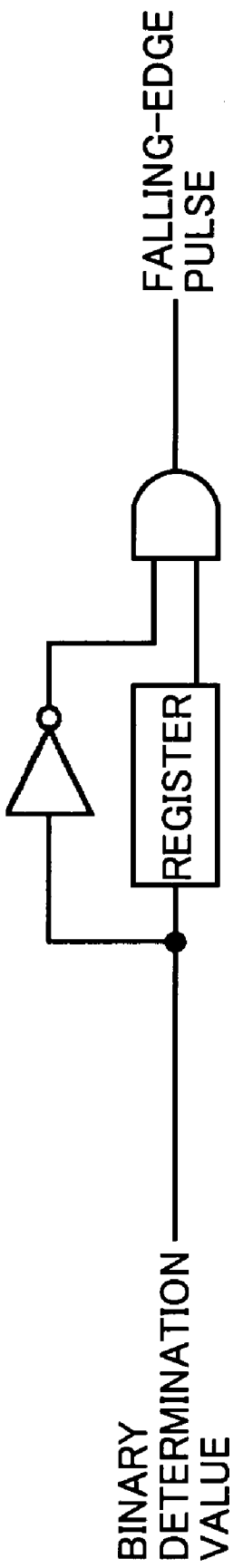
FIGS. 10A and 10B are circuit diagrams of a rising/falling-edge detection circuit.
Figure 10B:
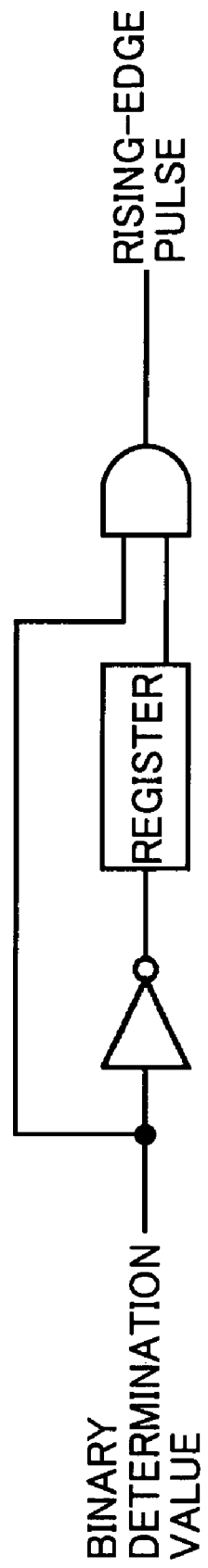

Rising-edge (falling-edge) detection circuit Hk (1) (Lk (1)) has a function for inputting a binary determination value, detecting the change-point from "0"→"1" and outputting a rising-edge pulse, and a function for detecting the change-point from "1"→"0" and outputting a falling-edge pulse. A circuit diagram of a rising/falling-edge detection circuit Hk (1) (Lk (1)) for carrying out these functions is shown in FIG. 10A and FIG. 10B.

The free-run counter Hk (2) (Lk (2)) uses the system clock as a reference to count the kth H (L) continuity of a start code in a start code detection window in response to the input of the start code detection window and a binary determination value, and outputs the count value (interval value). This count value is reset by either a rising-edge pulse or a falling-edge pulse (corresponding to T1, T2, T3 of FIG. 9). Therefore, the kth H (L) continuity of a start code in a start code detection window is indicated by a count value output from the free-run counter Hk (2) (Lk (2)). The above operating procedure is achieved by the procedure shown in the flowchart of FIG. 5.

The comparator Hk (3) (Lk (3)) outputs an H (L) continuity determination result in response to the input of a count value (interval value) and the upper and lower limit values of each continuity detection k range. The comparator Hk (3) (Lk (3)) outputs an H (L) continuity determination result based on a rising/falling-edge interval value corresponding to the count value within this range by externally specifying the upper limit and lower limit of a PASS region of the range of the kth H (L) continuity relative to a count value as shown in FIG. 9. If the count value (interval value) is within the above-mentioned PASS region, the comparator Hk (3) (Lk (3)) outputs PASS as the H (L) continuity determination result.

However, in determining the kth H (L) continuity, a margin of α(for example, α=1 bit/8) of the data period of the binary determination value within the range of each H (L) continuity detection k can be set before and after the kth H (L) continuity. This is because setting the range too strictly raises the possibility of an error signal determination being made even for a signal that is essentially a VBI signal. In order to achieve this margin, the setting can be made such that the upper and lower limit values of the PASS region of each H (L) continuity k become broader than the range of each H (L) continuity detection k.

Figure 24:
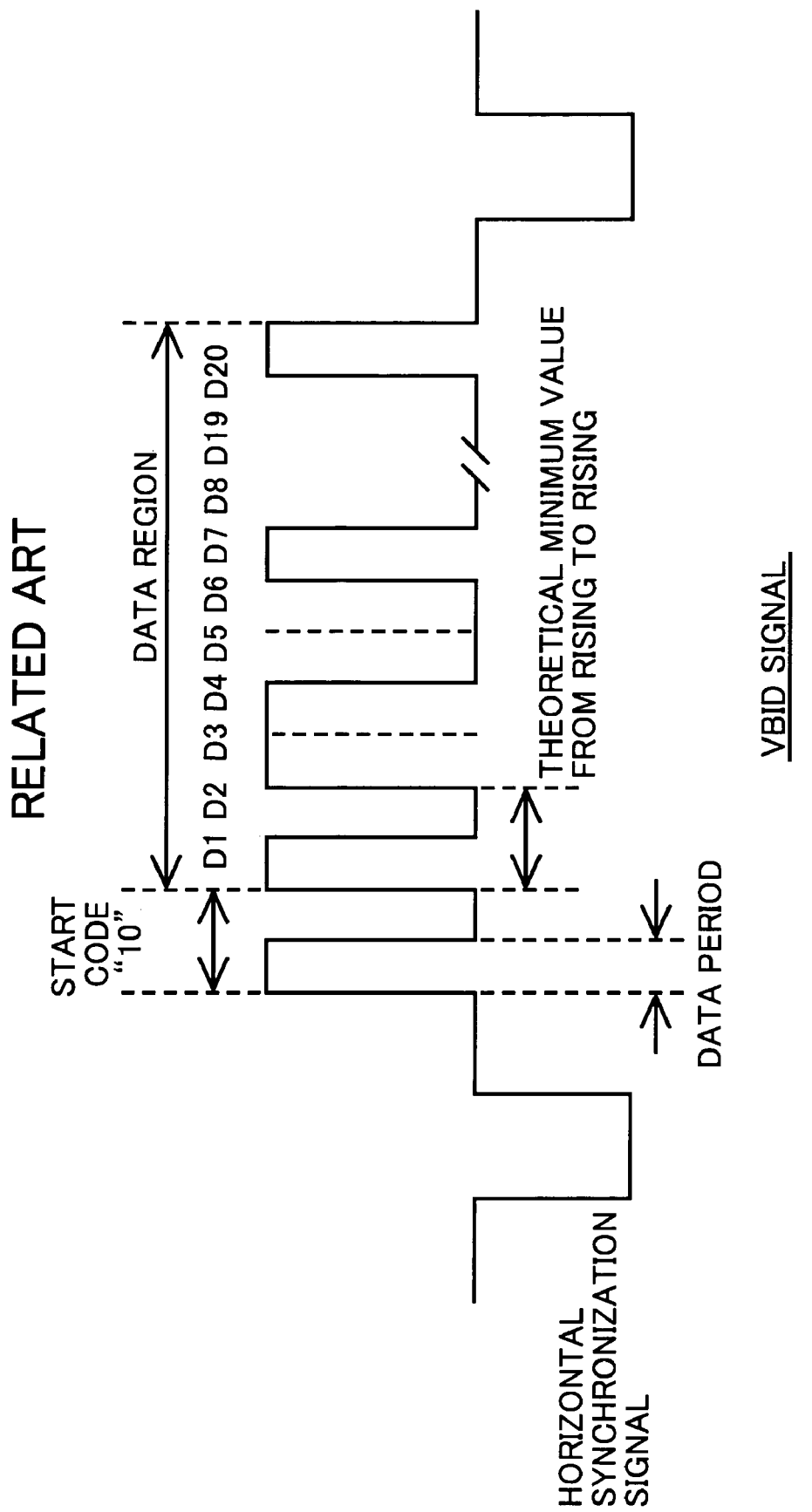
FIG. 24 is a diagram illustrating the waveform of a VBID signal as one example of a VBI signal.

If the VBID signal shown in FIG. 24 is taken as an example, by letting D represent a data period of the VBID signal, the "1" determination time period continues in the range of $(1-\alpha)D$, for example, (⅞)D through $(1+\alpha)D$, for example, (9/8)D in H continuity detection k within the start code detection window, that is, rising-edge interval values are counted within the PASS region of H continuity 1. Then, immediately thereafter, a "0" determination time period continues beyond $(1-\alpha)D$, for example, (⅞)D in L continuity detection 1 (L1), that is, falling-edge interval values are counted within the PASS region-of L continuity 1. In that case, the start detection circuit 10 determines that a start code exists, and outputs PASS.

The error determination circuit 15 carries out an error determination in accordance with a start code determination output by the start code detection circuit 10. If the start code determination is PASS, the error determination circuit 15 determines a relevant VBI signal exists, and does not output an error signal. If the start code determination is NG, the error determination circuit 15 determines that a relevant VBI signal does not exists, and output an error signal, which is the detection of a start code error.

Second Embodiment

Figure 11:
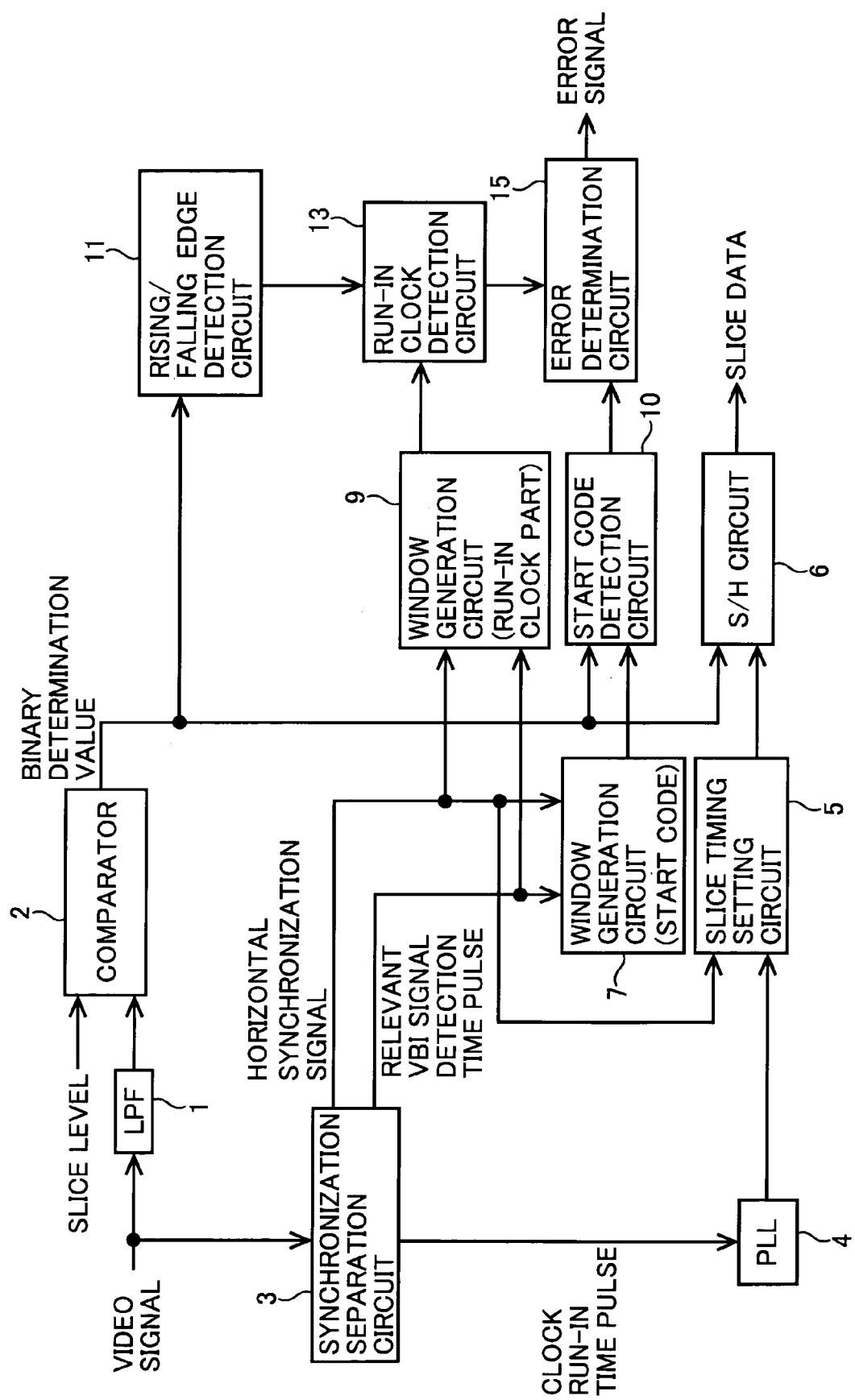
FIG. 11 is a block diagram of a false-positive detection prevention circuit of a second embodiment.

Next, the constitution of a false-positive detection prevention circuit of a second embodiment of the present invention is shown in FIG. 11. The false-positive detection prevention circuit of the second embodiment comprises an LPF 1, comparator 2, synchronization separation circuit 3, PLL 4, slice timing setting circuit 5, sampling hold circuit 6, window generation circuit 7, window generation circuit 9, start code detection circuit 10, rising/falling-edge detection circuit 11, run-in clock detection circuit 13, and error determination circuit 15. This constitution adds a window generation circuit 9, rising/falling-edge detection circuit 11, and run-in clock detection circuit 13 to the false-positive detection prevention circuit of the first embodiment. Accordingly, because the constitutional blocks taken up in the first embodiment have the same functions in the second embodiment, explanations of these blocks will be omitted.

The window generation circuit 9 is a circuit, which receives a horizontal synchronization signal and a relevant VBI signal detection time pulse from the synchronization separation circuit 3, and which generates a window for extracting the run-in clock part of the relevant VBI signal. In other words, this window is set so as to comprise a time period where a clock run-in signal exists, and is generated for detecting a clock run-in signal by using a horizontal synchronization signal as a reference. Therefore, this process guarantees that a pulse, which exists in a window for run-in clock detection, is a clock run-in signal under normal circumstances, and is not another signal (start code, data region or the like).

The window generation circuit 9 has the same constitution as the window generation circuit shown in FIG. 3, which was explained with regard to the First Embodiment, and the output window signal is a window for run-in clock detection. The operation involving the generation of a window signal for detecting a run-in clock is the same as that of the flowchart shown in FIG. 5, and as such, a further explanation of the window generation circuit 9 will be omitted.

The rising/falling-edge detection circuit 11 features the same constitution as the rising/falling-edge detection circuit Hk (1) (Lk (1)) in the First Embodiment. Therefore, since the circuit diagram of the rising/falling-edge detection circuit 11 is the same as that in FIG. 10A and FIG. 10B, an explanation will be omitted.

The run-in clock detection circuit 13 is a circuit, which has input with a rising/falling-edge pulse from the rising/falling-edge detection circuit 11, and a run-in clock detection window from the window generation circuit 9, and which carries out a determination of a clock run-in signal and outputs this determination result. When this circuit carries out a determination for a clock run-in signal, it evaluates the number of clock run-in signals and period between clock run-in signals (cycle) in the run-in clock detection window. When the number of times of clock run-in signals and period of clock run-in signals targeted for evaluation match the clock run-in signal pattern of a relevant VBI signal, the determination is that a relevant VBI signal exists.

Figure 12:
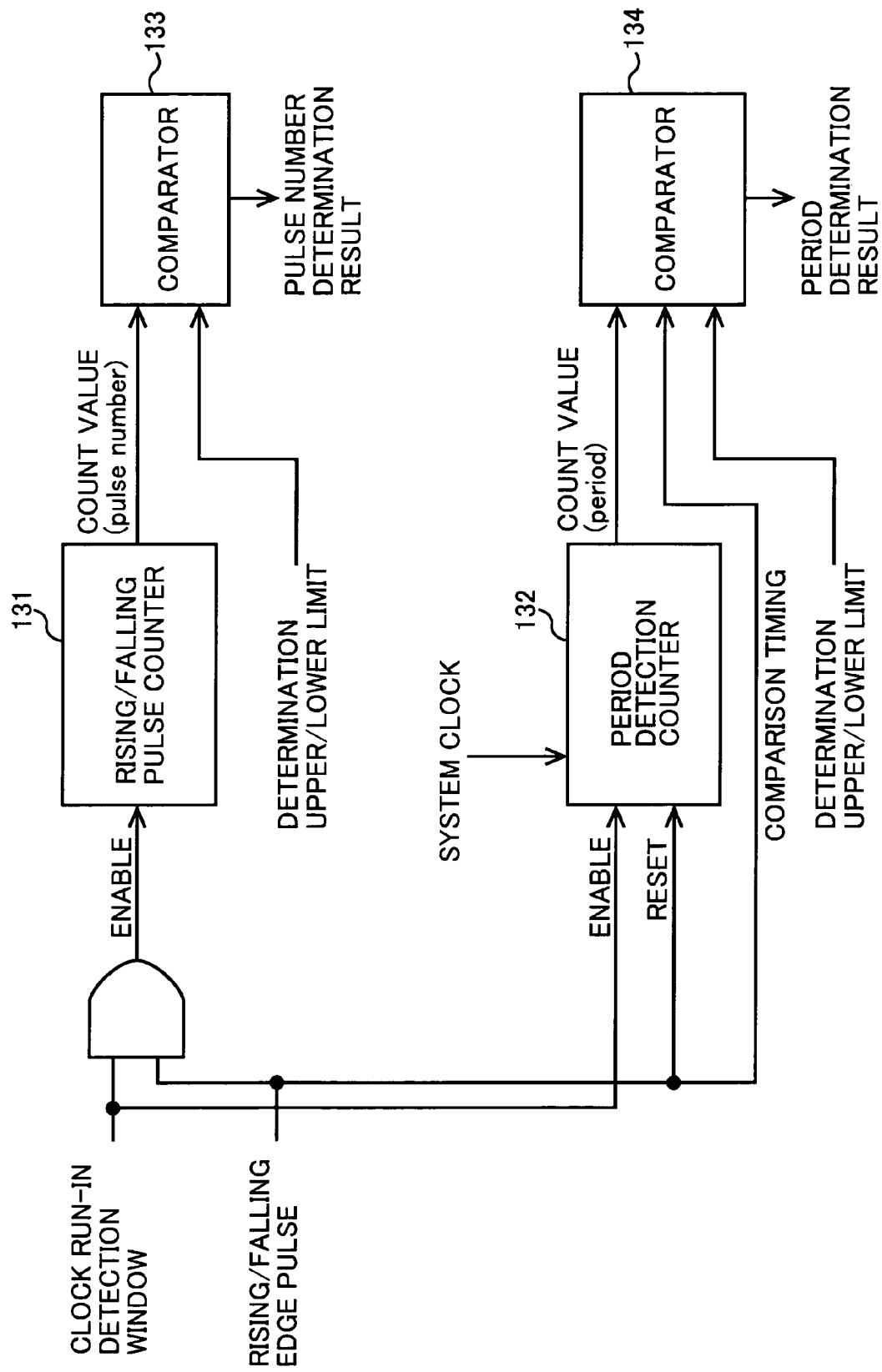
FIG. 12 is a block diagram of a run-in clock detection circuit 13.
Figure 13:
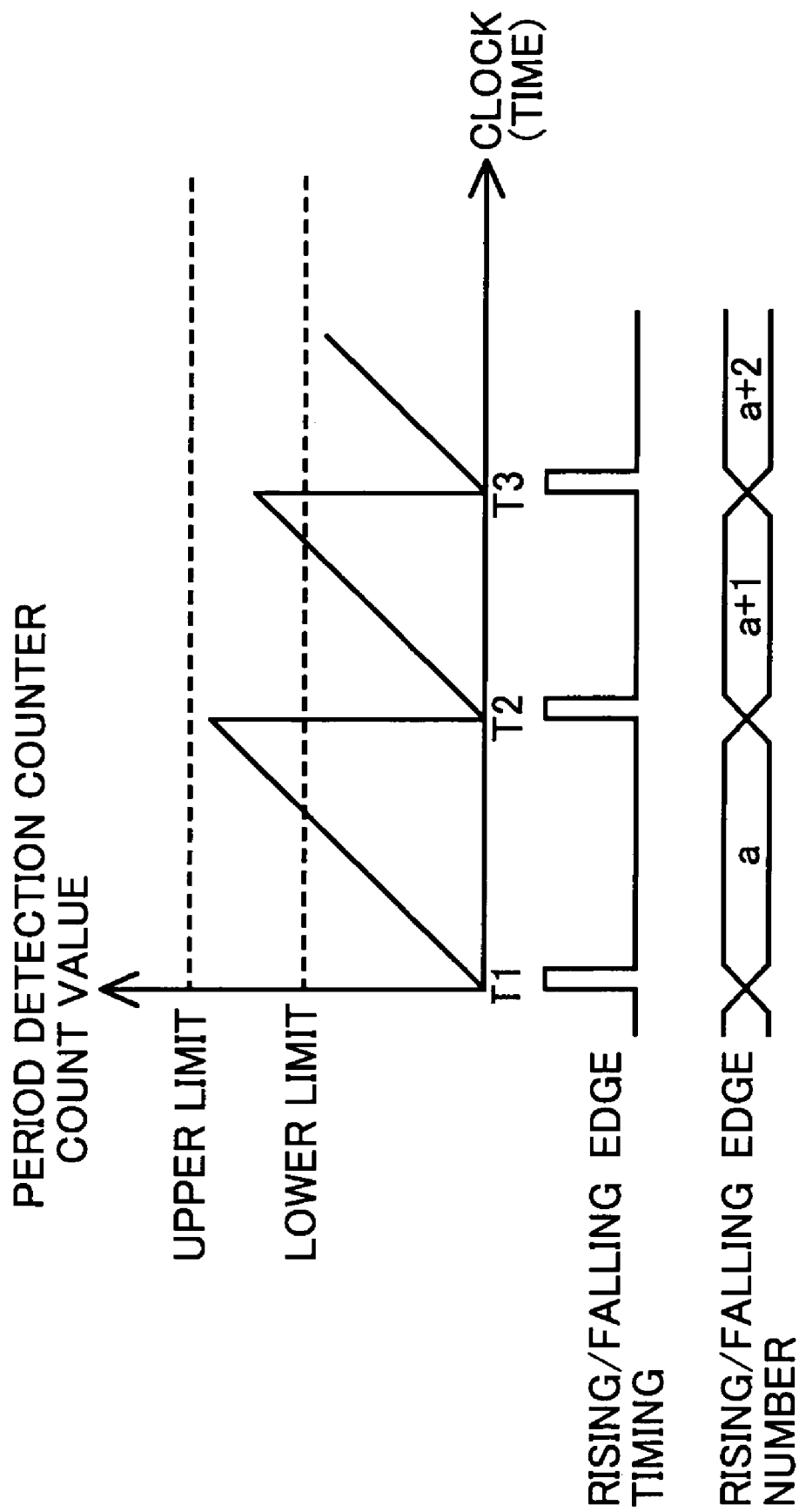
FIG. 13 is a graph of count values (periods)—number of clocks (or clock count values) in a period determination result output.

A method for carrying out the above-described evaluation of the number and period of clock run-in signals will be explained in detail using FIGS. 12 and 13. FIG. 12 shows a block diagram of a run-in clock detection circuit 13, and FIG. 13 shows a graph of count values (periods)—number of clocks (or clock count values).

As shown in FIG. 12, the run-in clock detection circuit 13 comprises a rising/falling pulse counter 131, period detection counter 132, and comparators 133, 134. A run-in clock detection window from the window generation circuit 9 and a rising/falling-edge pulse from the rising/falling-edge detection circuit 11 are input into an AND circuit and period detection counter 132. Also, a rising/falling-edge pulse is inputted into the comparator 134 as comparison timing.

The rising/falling pulse counter 131 is a circuit for measuring the number of rising/falling-edge pulses of clock run-in signals in a run-in clock detection window. An AND circuit receives a clock run-in detection window and a rising/falling-edge pulse, and outputs an enable signal. When the rising/falling pulse counter 131 carries out the measurement, it outputs count values (pulse number) on the basis of the enable signal. These count values are corresponding to the number of rising/falling-edge pulses.

The period detection counter 132, in response to the input of a run-in clock detection window and rising/falling-edge pulse, counts the period of the clock run-in signal in this window using the system clock as a reference, and outputs this count value (period). This count value is reset by either a rising-edge pulse or a falling-edge pulse. Therefore, the period of clock run-in signals is expressed as the count value output from the period detection counter 132. The above operating procedure is achieved by the procedure shown in the flowchart of FIG. 5.

The comparator 133 receives the count values (pulse number) and the upper limit and lower limit values, and outputs a pulse number determination result. The comparator 133 measures whether or not count values (pulse number) is within the range of the upper limit and lower limit values input from outside. When the count values (pulse number) are within the range of the upper limit and lower limit values, the comparator 133 outputs the pulse number determination result as OK.

The comparator 134 receives the count values (periods), the upper limit and lower limit values for clock run-in signal period determination, and rising/falling-edge pulses as comparison timing, and outputs a period determination result by resetting the count value (period). As shown in FIG. 13, the comparator 134 measures whether or not count values (periods) derived from rising/falling-edge timing (corresponding to T1, T2, T3) are within the range of the upper limit and lower limit values input from outside. When the count values (periods) are within these upper limit and lower limit values, the comparator 134 outputs the period determination result as OK.

Figure 25:
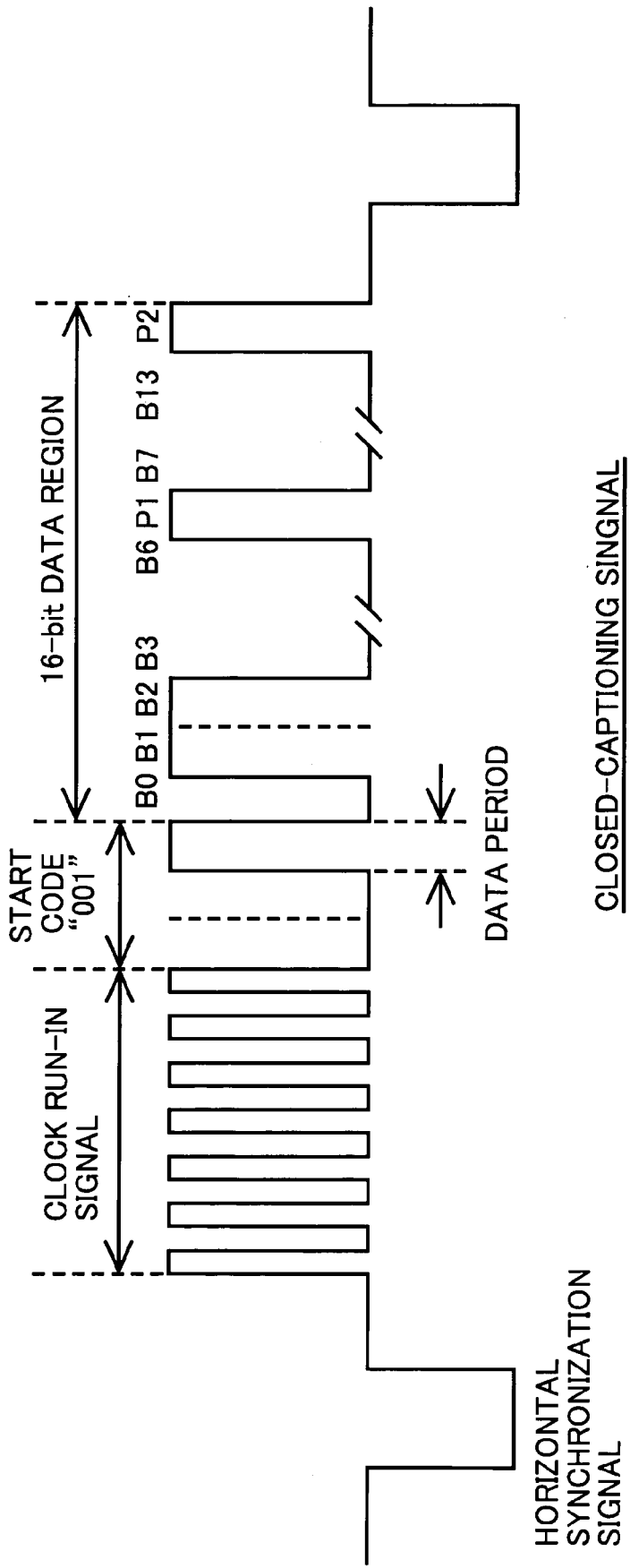
FIG. 25 is a diagram illustrating the waveform of a closed caption signal as one example of a VBI signal comprising a clock run-in signal.
Figure 26:
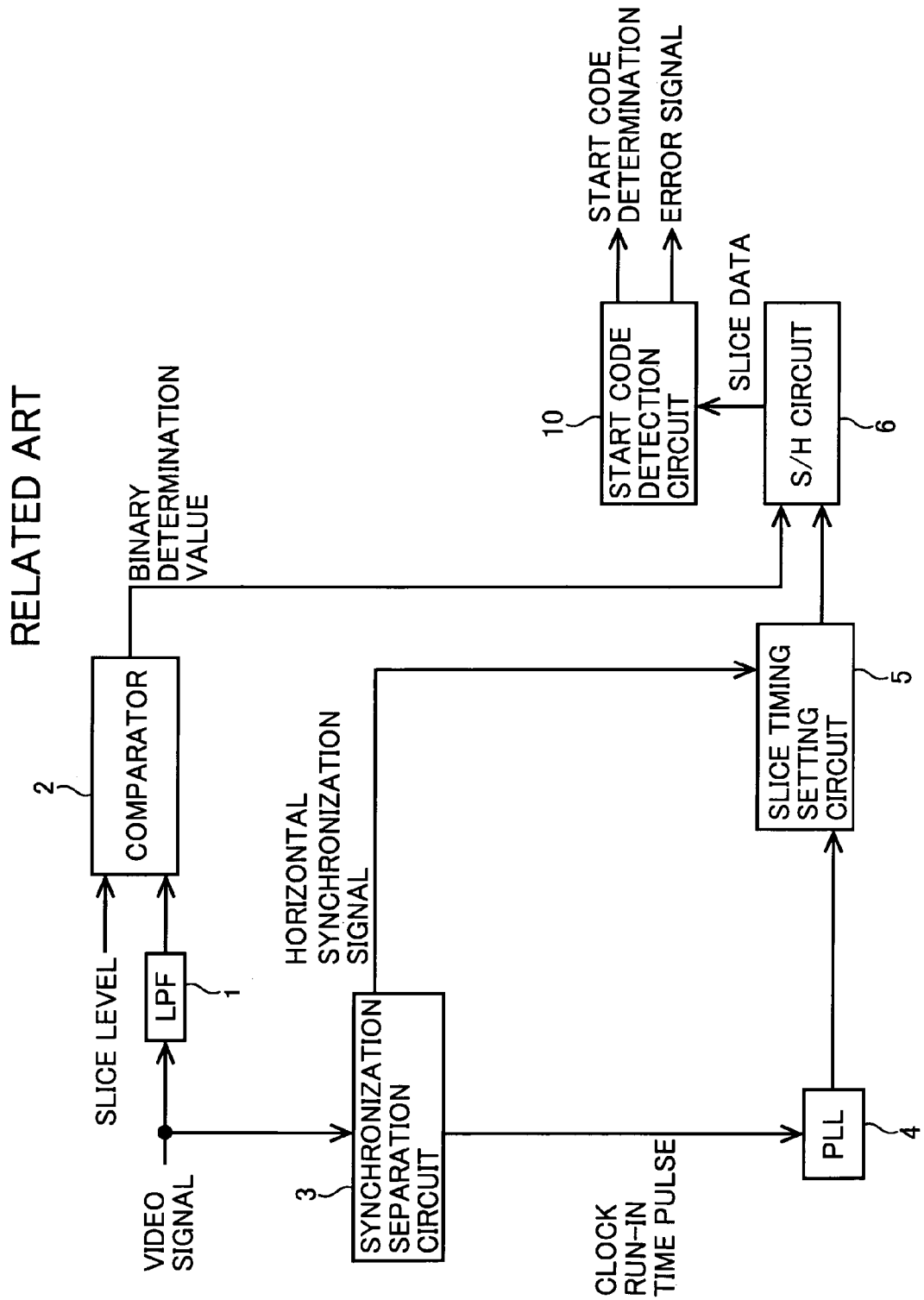
FIG. 26 is a block diagram of a conventional false-positive detection prevention circuit.

The utilization of the constitution of the second embodiment is more effective than that of the first embodiment for a VBI signal having a clock run-in signal, like the closed captioning signal of FIG. 25. In other words, adding determination results of the period and pulse number of a clock run-in signal is more effective than simply detecting the start code. The determination method of the period and pulse number of a clock run-in signal includes a step for determining the change-point of the binary determination value (either "0"→"1" or "1"→"0") and a step for measuring the period and pulse number of this change-point.

The error determination circuit 15 carries out an error determination based on a start code determination output by the start code detection circuit 10, and a pulse number determination result and period determination result output by the run-in clock detection circuit 13. When the start code determination is PASS, and the pulse number determination result and the period determination result are OK, a relevant VBI signal is determined to exist, and an error signal is not output. When any of the start code determination, pulse number determination result or period determination result is NG, a relevant VBI signal is determined not to exist, and an error signal is output.

Figure 14:
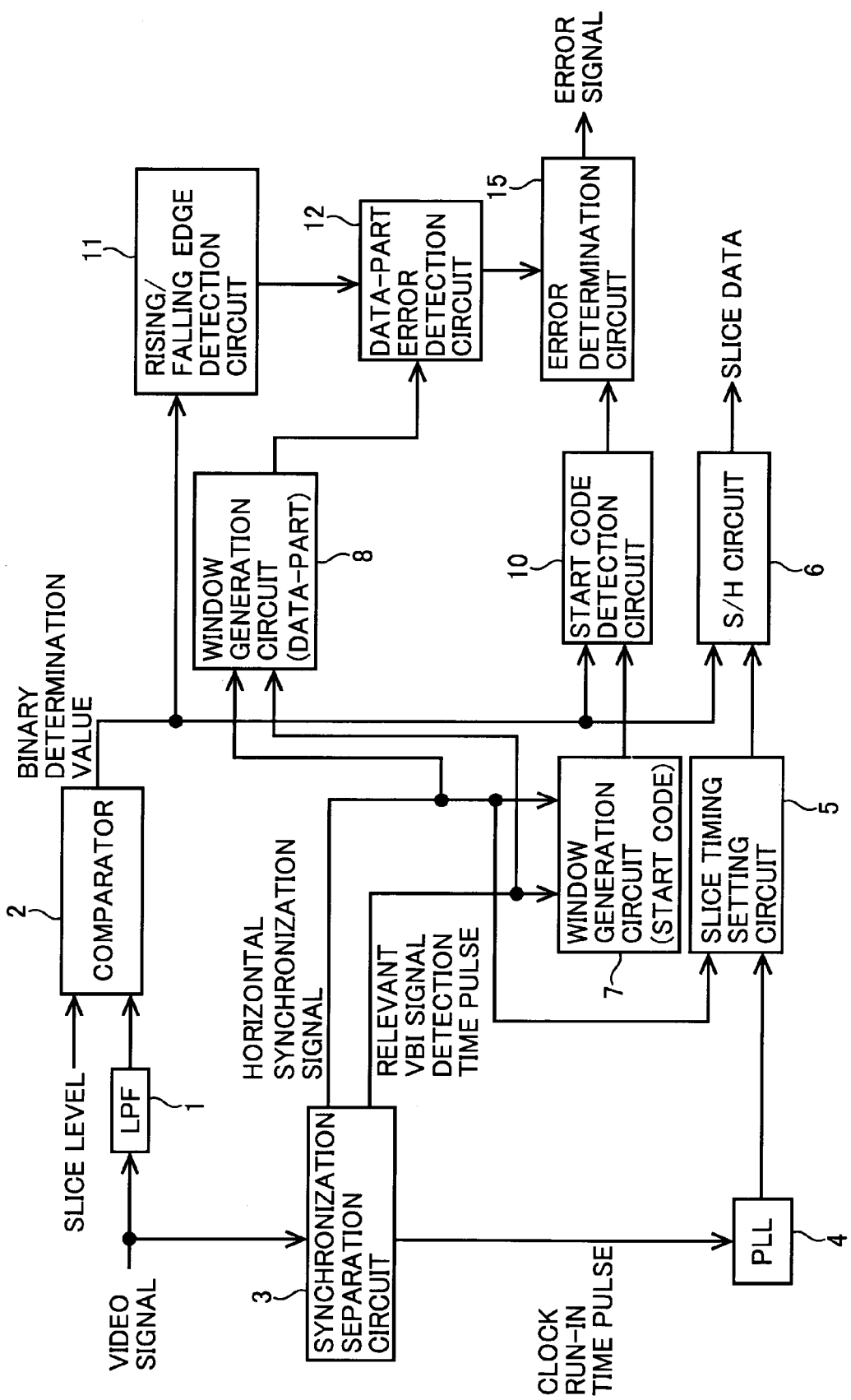
FIG. 14 is a block diagram of a false-positive detection prevention circuit of a third embodiment.

Third Embodiment,

Next, the constitution of a false-positive detection prevention circuit of a third embodiment of the present invention is shown in FIG. 14. The false-positive detection prevention circuit of the third embodiment comprises an LPF 1, comparator 2, synchronization separation circuit 3, PLL 4, slice timing setting circuit 5, sampling hold circuit 6, window generation circuit 7, window generation circuit 8, start code detection circuit 10, rising/falling-edge detection circuit 11, data-part error detection circuit 12, and error determination circuit 15. This constitution adds a window generation circuit 8, rising/falling-edge detection circuit 11, and data-part error detection circuit 12 to the false-positive detection prevention circuit of the first embodiment. Accordingly, because the constitutional blocks taken up in the first embodiment have the same functions in the third embodiment, explanations of these blocks will be omitted.

The window generation circuit 8 is a circuit, which receives a horizontal synchronization signal and a relevant VBI signal detection time pulse from the synchronization separation circuit 3, and which generates a window for extracting the data part of the relevant VBI signal. In other words, this window is set so as to comprise a time period where a data part exists, and is generated for detecting an error in the data part by using a horizontal synchronization signal as a reference. Therefore, this process guarantees that a pulse, which exists in a window for data detection, is a normal signal under normal circumstances, and is not another signal (such as a clock run-in signal).

The window generation circuit 8 has the same constitution as the window generation circuit shown in FIG. 3, which was explained with regard to the First Embodiment, and the output window signal is a window for data-part error detection. The operation involving the generation of a window signal for detecting a data-part error is the same as that of the flowchart shown in FIG. 5, and as such, an explanation of the window generation circuit 8 will be omitted.

Furthermore, when the detection target is VBI signal, and the period of data change-points in the start code (framing code) coincides with the period of change-points of a data part, the window generation circuit 8 can generate a window for detecting an error in a region where a start code region has been added to a data part.

Further, a margin α, for example, ½ of the data period D of a VBI signal can be set before and after the range of a data part for an output error detection window. This process is the same as the margin setting of the start code detection window in the first embodiment.

The rising/falling-edge detection circuit 11 features the same constitution as the rising/falling-edge detection circuit Hk (1) (Lk (1)) in the First Embodiment. Therefore, since the circuit diagram of the rising/falling-edge detection circuit 11 is the same as that in FIG. 6, an explanation will be omitted.

The data-part error detection circuit 12 is a circuit, which receives a rising/falling-edge pulse from the rising/falling-edge detection circuit 11 and a data-part error detection window from the window generation circuit 8 for carrying out an error determination for a data part, and which outputs a data-part error detection determination result. In this circuit, when carrying out error detection for a data part, an evaluation of a binary determination value "0/1" in the data-part error detection window, in other words, an evaluation of "0/1" in the data part is carried out. The evaluation method for this is one whereby the interval between the rising-edges (falling-edges) of the binary determination value is evaluated with reference to the system clock. That is, the system clock is used as a reference signal to count either the change-point of the rising-edge ("0"→"1") or the change-point of a falling-edge ("1"→"0") of a binary determination value, and to measure the interval where the rising/falling-edge exists as a count value. When this interval value satisfies a predetermined condition in the data part of the relevant VBI signal, the relevant VBI signal is determined to exist.

Figure 15:
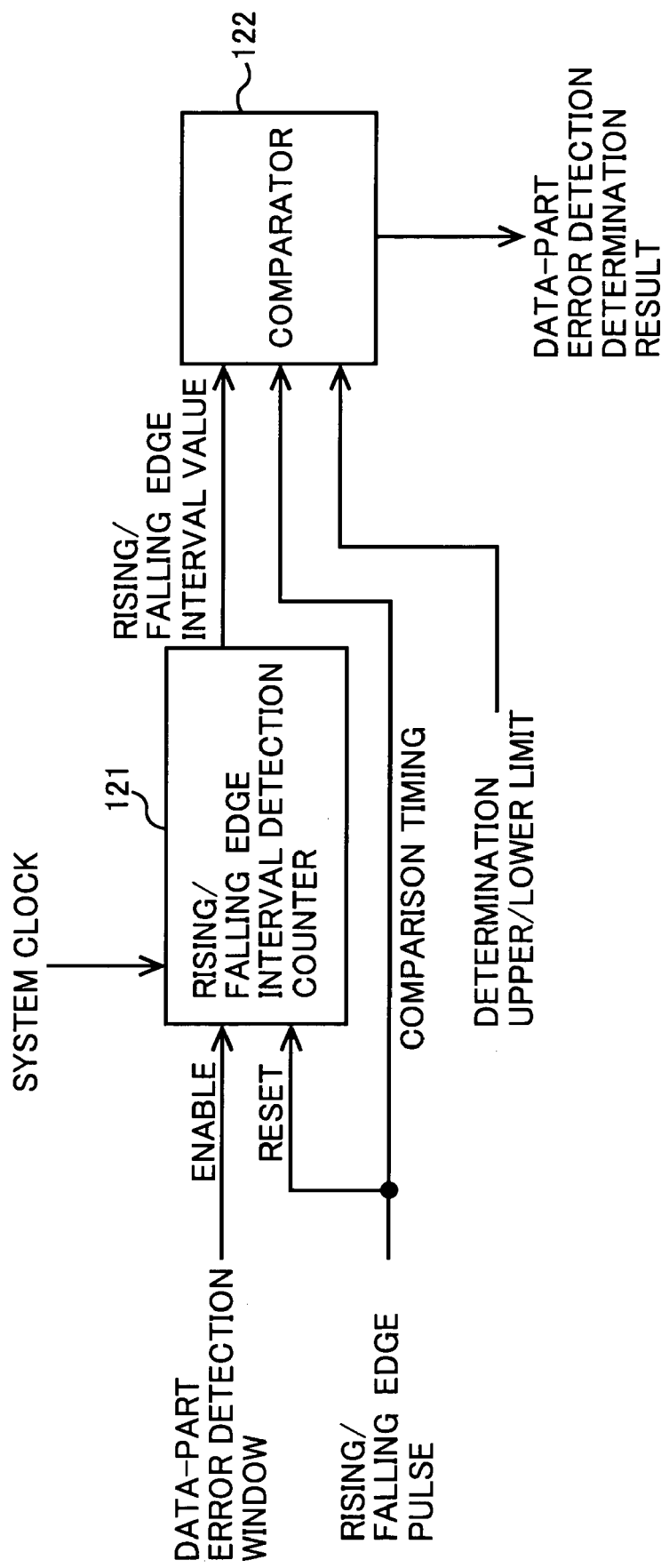
FIG. 15 is a block diagram of a data part error detection circuit 12.
Figure 16:
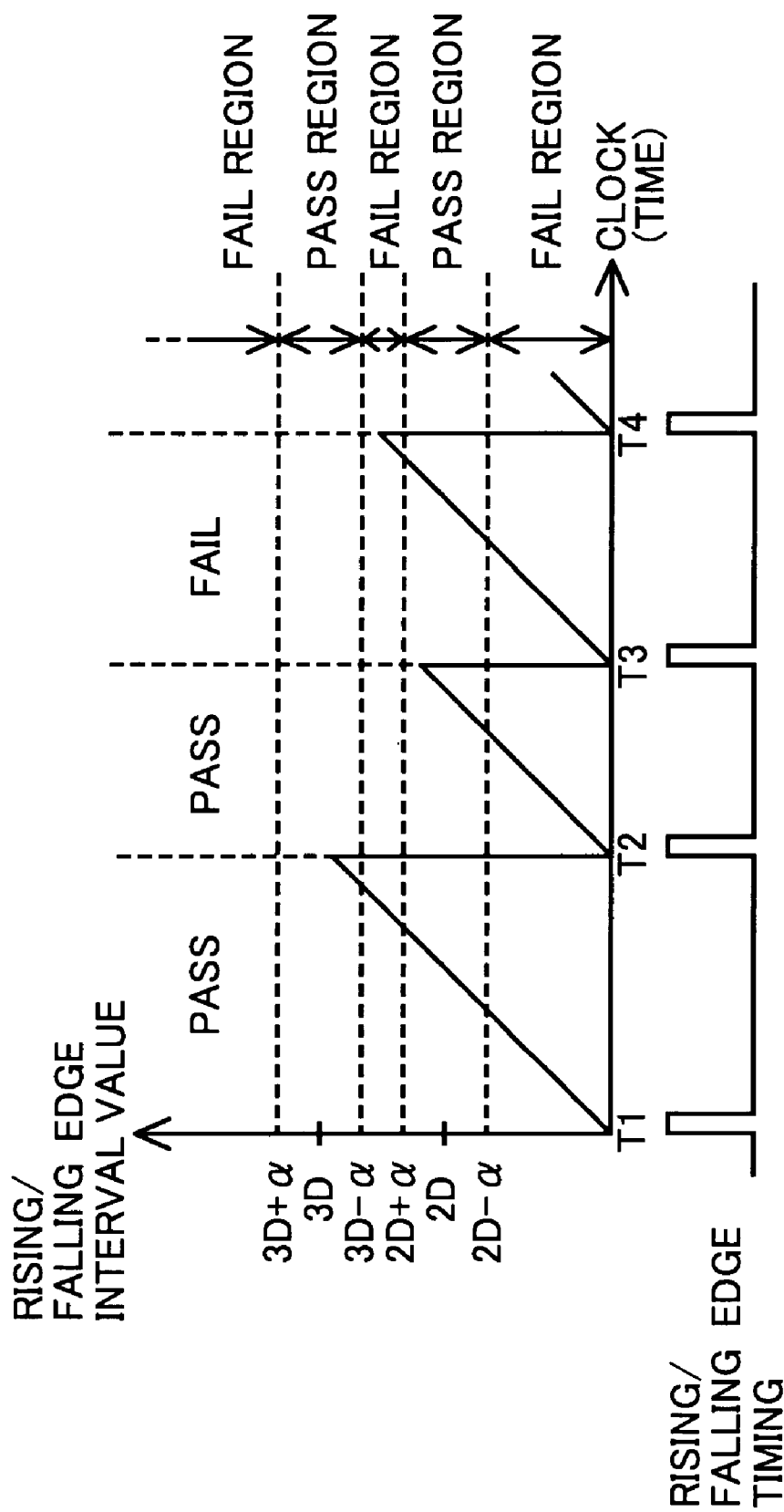
FIG. 16 is a graph of rising/falling-edge interval values—number of clocks (or clock count values) in a data part error detection determination result output.
Figure 17A:
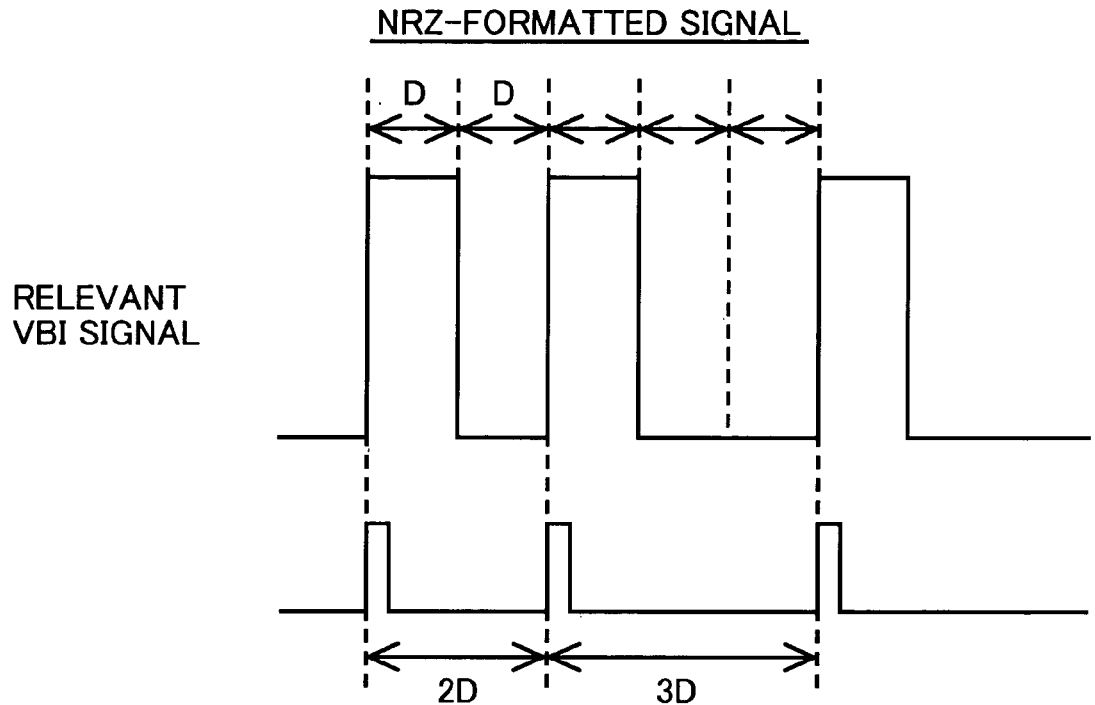
FIGS. 17A and 17B are diagrams related to a VBI signal determination based on the data period of a VBI signal.
Figure 17B:
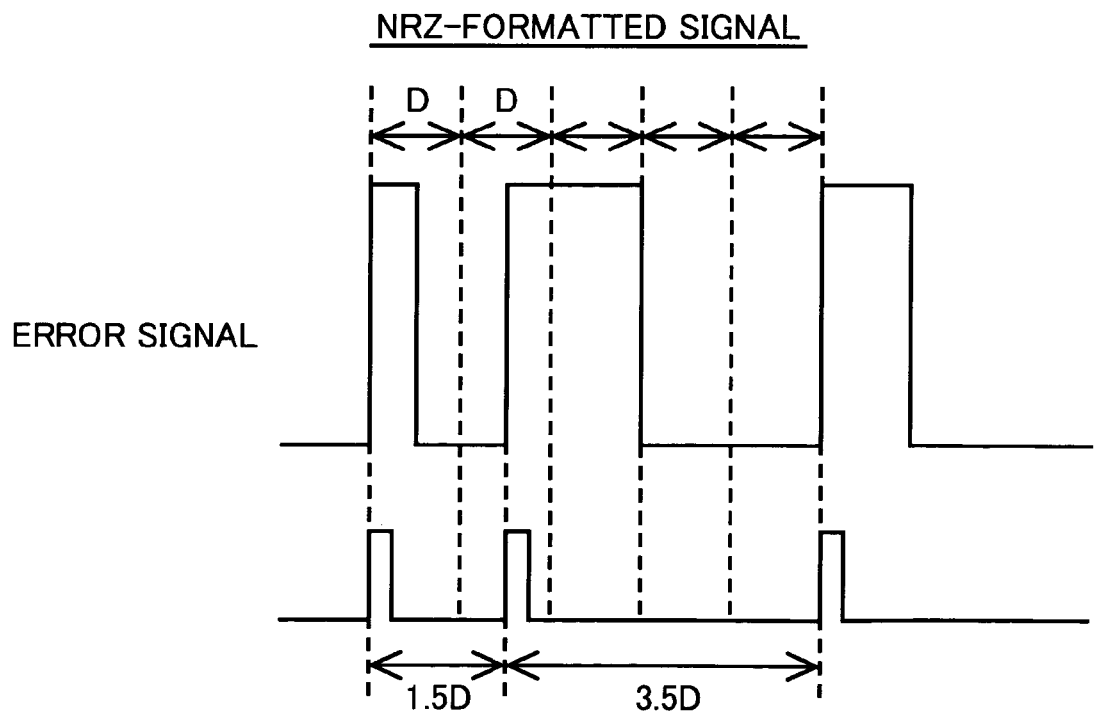

The above-mentioned method for evaluating an interval value will be explained in detail using FIGS. 15 through FIG. 17A and FIG. 17B. FIG. 15 shows a block diagram of a data-part error detection circuit 12, and FIG. 16 shows a graph of rising/falling-edge interval values—number of clocks (or clock count values) in a data-part error detection determination result output. Further, FIG. 17A and FIG. 17B show diagrams related to a VBI signal determination based on the data period of a VBI signal, and in particular, to a determination for a VBID signal. In FIGS. 16, 17A, 17B, the symbol D denotes a data period of a general VBI signal and is not identical with the data period in the VBID signal as shown in FIG. 24.

As shown in FIG. 15, the data-part error detection circuit 12 comprises a rising/falling-edge interval detection counter 121 and a comparator 122. The rising/falling-edge interval detection counter 121 receives a data-part error detection window from the window generation circuit 8 and a rising/falling-edge pulse from the rising/falling-edge detection circuit 11. Further, a rising/falling-edge pulse is inputted to the comparator 122 as comparison timing.

The rising/falling-edge interval detection counter 121, in response to the input of a data-part error detection window and rising/falling-edge pulse, counts the intervals, with reference to the system clock, where the rising-edges (falling-edges) in this window exist, and outputs rising/falling-edge interval values as this count value. The count value is reset by either a rising-edge pulse or a falling-edge pulse. Therefore, intervals where a rising/falling-edge exist are expressed as the count value output by the rising/falling-edge interval detection counter 121. The above operating procedure is achieved by the procedure shown in the flowchart of FIG. 5.

The comparator 122 receives the rising/falling-edge interval values, the upper limit and lower limit values for data-part error detection, and rising/falling-edge pulses as comparison timing, and outputs a data-part error detection determination result by resetting the rising/falling-edge interval value. As shown in FIG. 16, the comparator 122 measures whether or not rising/falling-edge interval values derived from rising/falling-edge timing (corresponding to T1, T2, T3, T4) are within the range of the upper limit and lower limit values input from outside. When the rising/falling-edge interval values are within the range of these upper limit and lower limit values (Pass region), the comparator 122 outputs the data-part error detection determination result as OK.

In FIG. 16, a range where a margin α is added to each data period D before and after a rising/falling-edge interval value is set as the Pass region, and regions other than this are set as the Fail regions. In other words, lower limit settings are designated as 2D−α, 3D−α, . . . , and upper limit settings are designated as 2D+α, 3D+α, . . . If an interval value, which is counted from when there is a rising/falling-edge timing until the next timing is in the Pass region, it is treated as data of a relevant VBI signal and PASS is output, and if it is in the Fail region, it is treated as data other than that of the relevant VBI signal, and FAIL is output.

A data-part error detection determination result is output by capturing the rising/falling-edge timing, and outputting either PASS or FAIL relative to a binary determination value in a data-part error detection window.

This embodiment can carry out this kind of determination because, in an NRZ-formatted signal typified by the VBID signal shown in FIG. 17A and FIG. 17B, it is theoretically not possible for either a rising-edge or a falling-edge reset timing in this data part to be located at a timing other than two-times, three-times, . . . a data period D. That is, the count values counted by the rising/falling-edge interval detection counter 121 should be 2D, 3D, . . .

Therefore, when a margin α is appropriately set, and the reset timing is at a position without a range corresponding to two-times±α, three-times±α, . . . of the data period D, a relevant VBI signal is considered not to exist, and FAIL is output. For example, if it is supposed that α=½D, FAIL is output relative to the error signal in FIG. 17B when reset timing comes at intervals where the interval value is less than 1.5D.

The error determination circuit 15 carries out error determination on the basis of a start code determination output by the start code detection circuit 10 and a data-part error detection determination result output by the data-part error detection circuit 12. When the start code determination is PASS, and the data-part error detection determination result is OK, a relevant VBI signal is determined to exist, and an error signal is not output. When either the start code determination or data-part error detection determination result determination is NG, a relevant VBI signal is determined not to exist, and an error signal is output.

The method for detecting an error in a data part in the Third Embodiment is effective for signals where the start code (framing code) is simple ("10") like a VBID signal.

Fourth Embodiment

Figure 18:
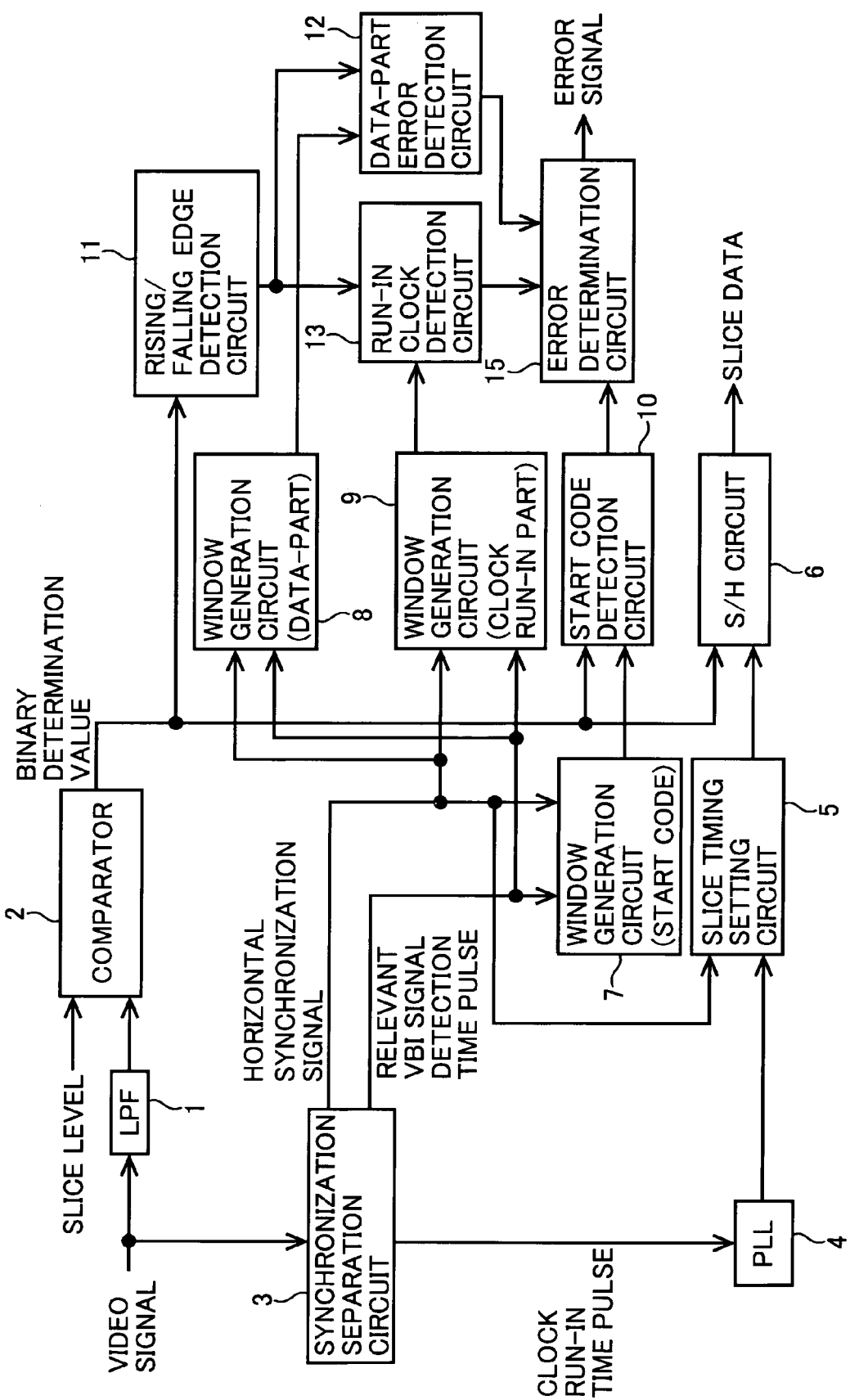
FIG. 18 is a block diagram of a false-positive detection prevention circuit of a fourth embodiment.

Next, the constitution of a false-positive detection prevention circuit of a fourth embodiment of the present invention is shown in FIG. 18. The false-positive detection prevention circuit of the fourth embodiment comprises an LPF 1, comparator 2, synchronization separation circuit 3, PLL 4, slice timing setting circuit 5, sampling hold circuit 6, window generation circuit 7, window generation circuit 8, window generation circuit 9, start code detection circuit 10, rising/falling-edge detection circuit 11, data-part error detection circuit 12, run-in clock detection circuit 13, and error determination circuit 15. In other words, the constitution of the fourth embodiment is a combination of the constitutions of the second embodiment and the third embodiment, and the operating process is also a combination of the two embodiments, and thus a detailed explanation will be omitted. Therefore, in the fourth embodiment, windows are set relative to the start code, data part, and clock run-in signal of an input vide signal, and the respective binary determination values in these windows are evaluated.

The error determination circuit 15 carries out error determination on the basis of a start code determination output by the start code detection circuit 10, a data-part error detection determination result output by the data-part error detection circuit 12, and a pulse number determination result and period determination result output by the run-in clock detection circuit 13. When the start code determination is PASS, and the pulse number determination result, period determination result, and data-part error detection determination result are OK, a relevant VBI signal is determined to exist, and an error signal is not output. Otherwise, a relevant VBI signal is determined not to exist, and an error signal is output.

Fifth Embodiment

Figure 19:
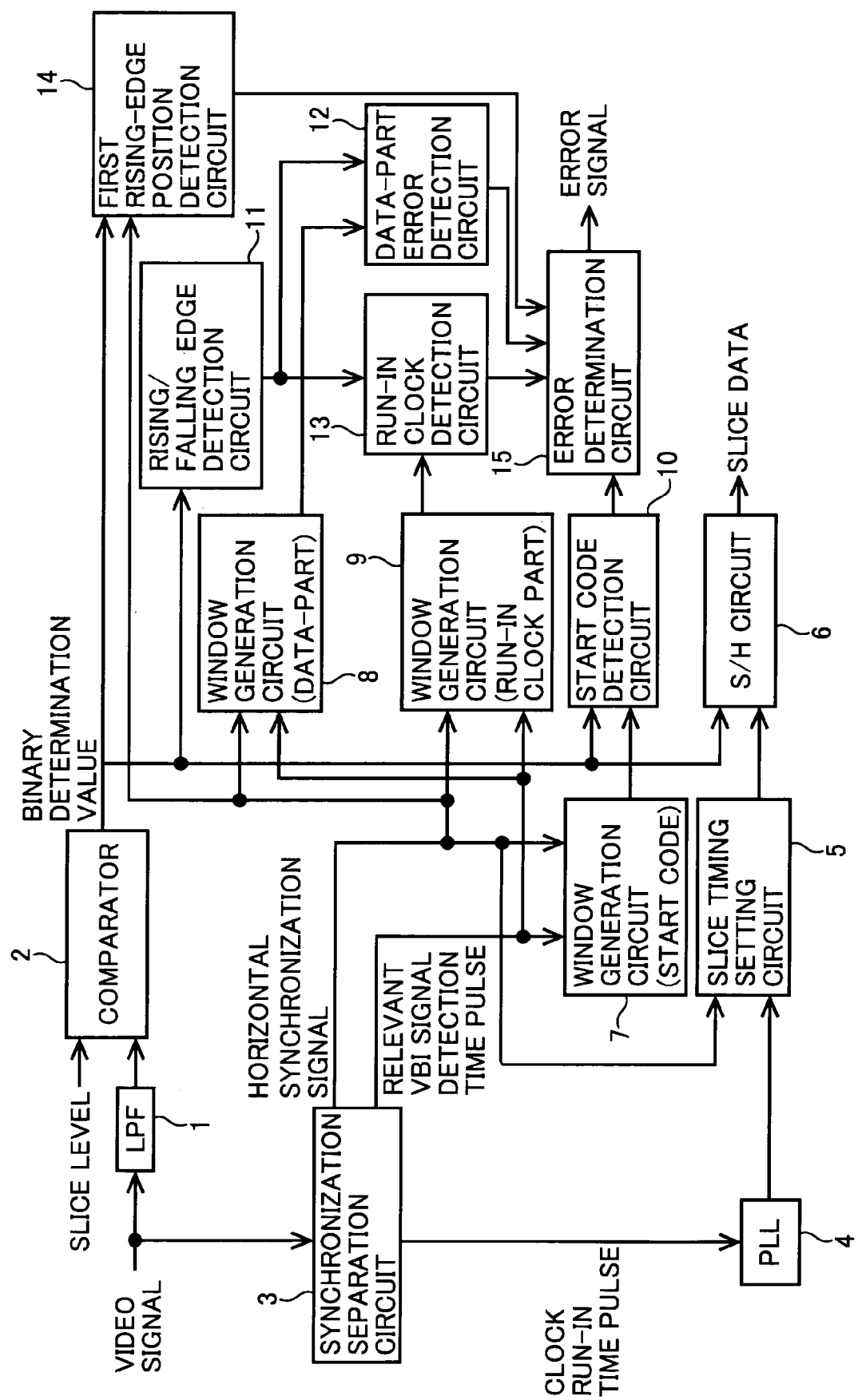
FIG. 19 is a block diagram of a false-positive detection prevention circuit of a fifth embodiment.

Next, the constitution of a false-positive detection prevention circuit of a fifth embodiment of the present invention is shown in FIG. 19. The false-positive detection prevention circuit of the fifth embodiment comprises an LPF 1, comparator 2, synchronization separation circuit 3, PLL 4, slice timing setting circuit 5, sampling hold circuit 6, window generation circuit 7-9, start code detection circuit 10, rising/falling-edge detection circuit 11, data-part error detection circuit 12, run-in clock detection circuit 13, a first rising-edge position detection circuit 14, and error determination circuit 15. This constitution adds a first rising-edge position detection circuit 14 to the false-positive detection prevention circuit of the fourth embodiment. Accordingly, since the constitutional blocks taken up in the first embodiment have the same functions in the fifth embodiment, explanations of these blocks will be omitted.

The first rising-edge position detection circuit 14 is a circuit, which receives a horizontal synchronization signal, a relevant VBI signal detection time pulse from the synchronization separation circuit 3, and a binary determination value from the comparator 2, and which detects the initial rising-edge position in each field, and outputs a determination result related to an error determination. In this circuit, the position at which a binary determination value initially changes from "0"→"1" is detected by using the horizontal synchronization signal in the last field as a reference, and the difference of this position in the present field from that in the previous field is evaluated. The first rising-edge position detection circuit 14 evaluates this first rising-edge position with reference to the system clock. The first rising-edge position detection circuit 14 measures the time period from the detection of the horizontal synchronization signal until the detection of the first rising-edge position as a count value that has the system clock as a reference. When there is a large difference in the respective count values of the two fields, a determination is made that a relevant VBI signal does not exist.

Figure 20:
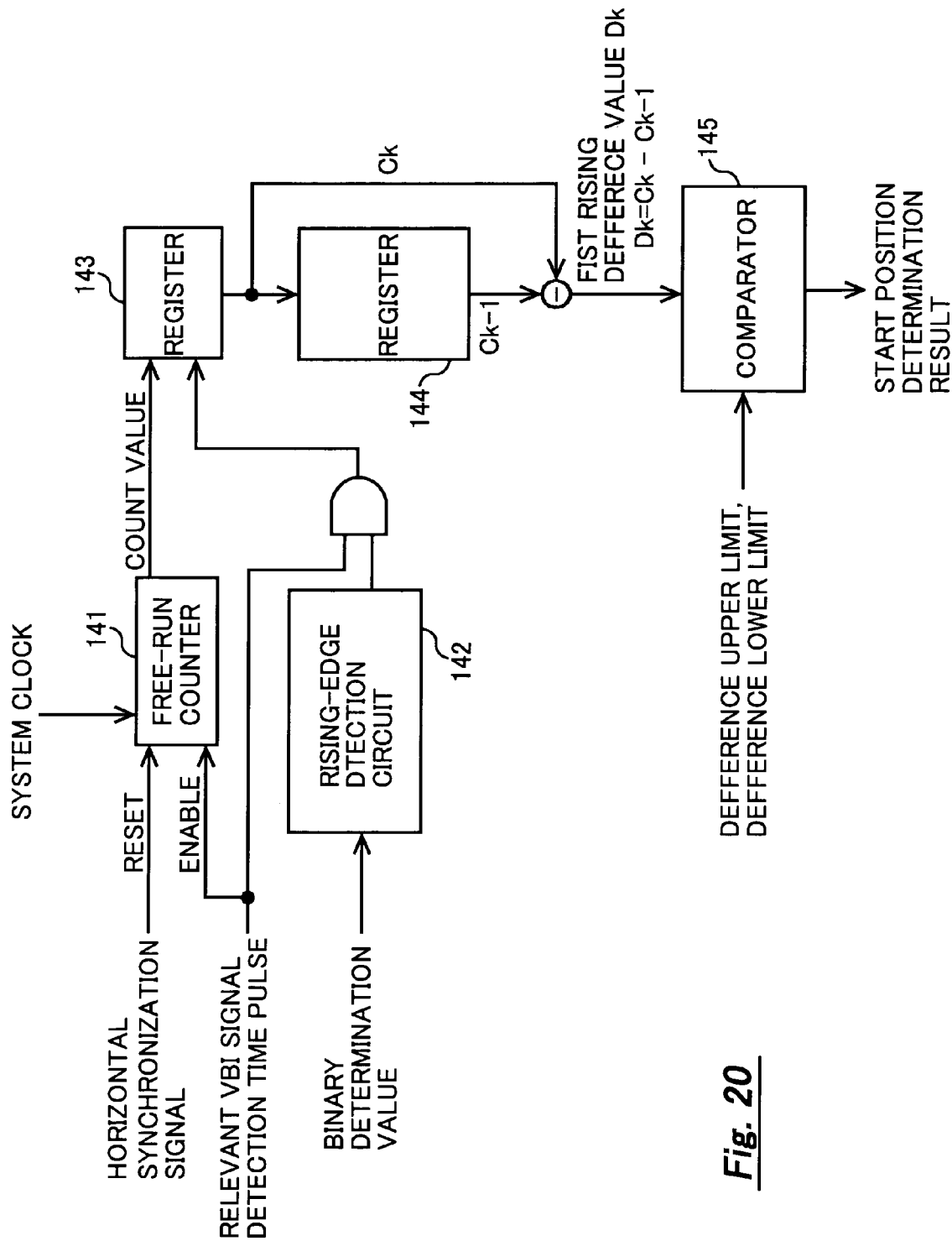
FIG. 20 is a block diagram of a first rising-edge position detection circuit 14.
Figure 21:
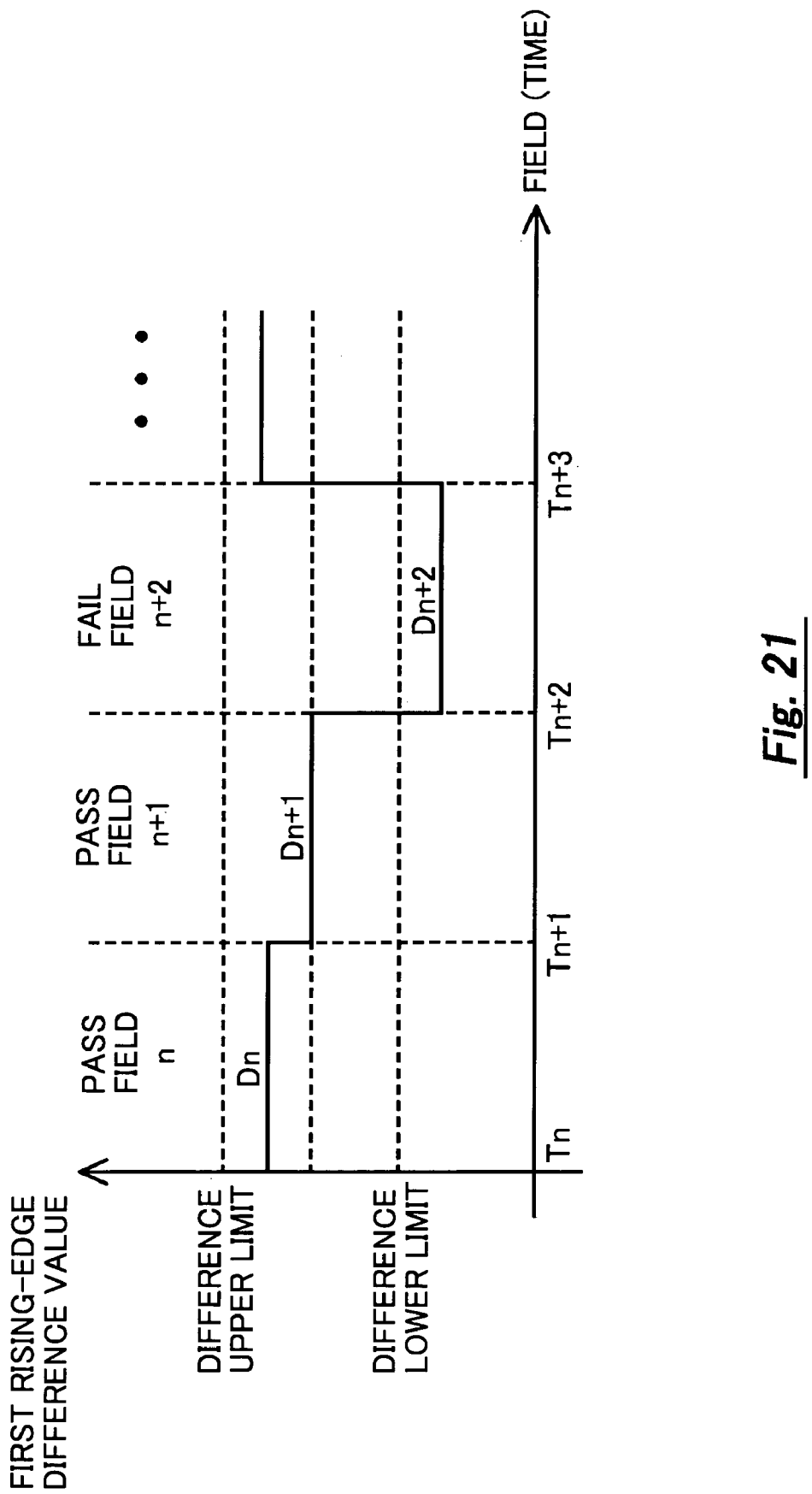
FIG. 21 is a graph of a first rising-edge difference values—fields (times) in a start position determination result output.

A method for evaluating the above-mentioned deviation of first rising-edge positions will be explained in detail using FIGS. 20 and 21. FIG. 20 shows a block diagram of a first rising-edge position detection circuit 14, and FIG. 21 shows a graph of first rising-edge difference values—fields (times) in a start position determination result output.

As shown in FIG. 20, the first rising-edge position detection circuit 14 has a free-run counter 141, rising/falling-edge detection circuit 142, registers 143, 144 and a comparator 145. The circuit 14 receives a horizontal synchronization signal from the synchronization separation circuit 3, a relevant VBI signal detection time pulse, and a binary determination value from the comparator 2.

The free-run counter 141 has the same constitution as the free-run counter W1 in the first embodiment, carries out the operational processing shown in the flowchart of FIG. 5, and means the detection time-period of a VBI signal between horizontal synchronization signals as a count value.

The rising/falling-edge detection circuit 142 has the same constitution as the rising/falling-edge detection circuit Hk (1) (Lk (1)) in the first embodiment, and outputs the rising/falling-edge pulse of a binary determination value.

Thereafter, an AND circuit receives a relevant VBI signal detection time pulse and rising/falling-edge pulse, and outputs the rising/falling-edge pulse in this detection time-period.

The register 143 is a circuit, which receives a count value output from the free-run counter 141, and a rising/falling-edge pulse in a relevant VBI signal detection time-period output from the AND circuit, and which holds the count value Ck at the time when the first rising-edge is detected in the kth field during a relevant VBI signal detection.

The register 144 is a circuit for holding the count value Ck−1 which is the count value of the last field held by the register 143. Count values Ck and Ck−1 are input to a differential circuit, and a first rising-edge difference value Dk (=Ck−Ck−1) is output as the count value difference between the two fields.

The comparator 145 receives Dk which is a difference of first rising edge and the upper and lower limits of the difference, and outputs a start position determination result. If Dk is within the range of the difference upper and lower limits specified from outside, then PASS is output as determination. If it is out of this range, a FAIL output is performed. In the graph of FIG. 21, Dn for the nth field n (corresponding to Tn through Tn+1) and a first rising-edge difference value Dn+1 for the (n+1)th field n+1 (corresponding to Tn+1 through Tn+2) are within the range of the difference upper limits between lower ones, and PASS has been output. By contrast, a first rising-edge difference value Dn+2 for the (n+2)th field n+2 (corresponding to Tn+2 through Tn+3) is out of the range of the difference upper limits between lower ones, and FAIL has been output.

The error determination circuit 15 carries out error determination on the basis of a start code determination output by the start code detection circuit 10, a data-part error detection determination result output by the data-part error detection circuit 12, a pulse number determination result and period determination result output by the run-in clock detection circuit 13, and a start position determination result output by the rising-edge position detection circuit. When the start code determination is PASS, and the pulse number determination result, period determination result, data-part error detection determination result, and start position determination result are all OK, a relevant VBI signal is determined to exist, and an error signal is not output. Otherwise, a relevant VBI signal is determined not to exist, and an error signal is output.

Figure 22:
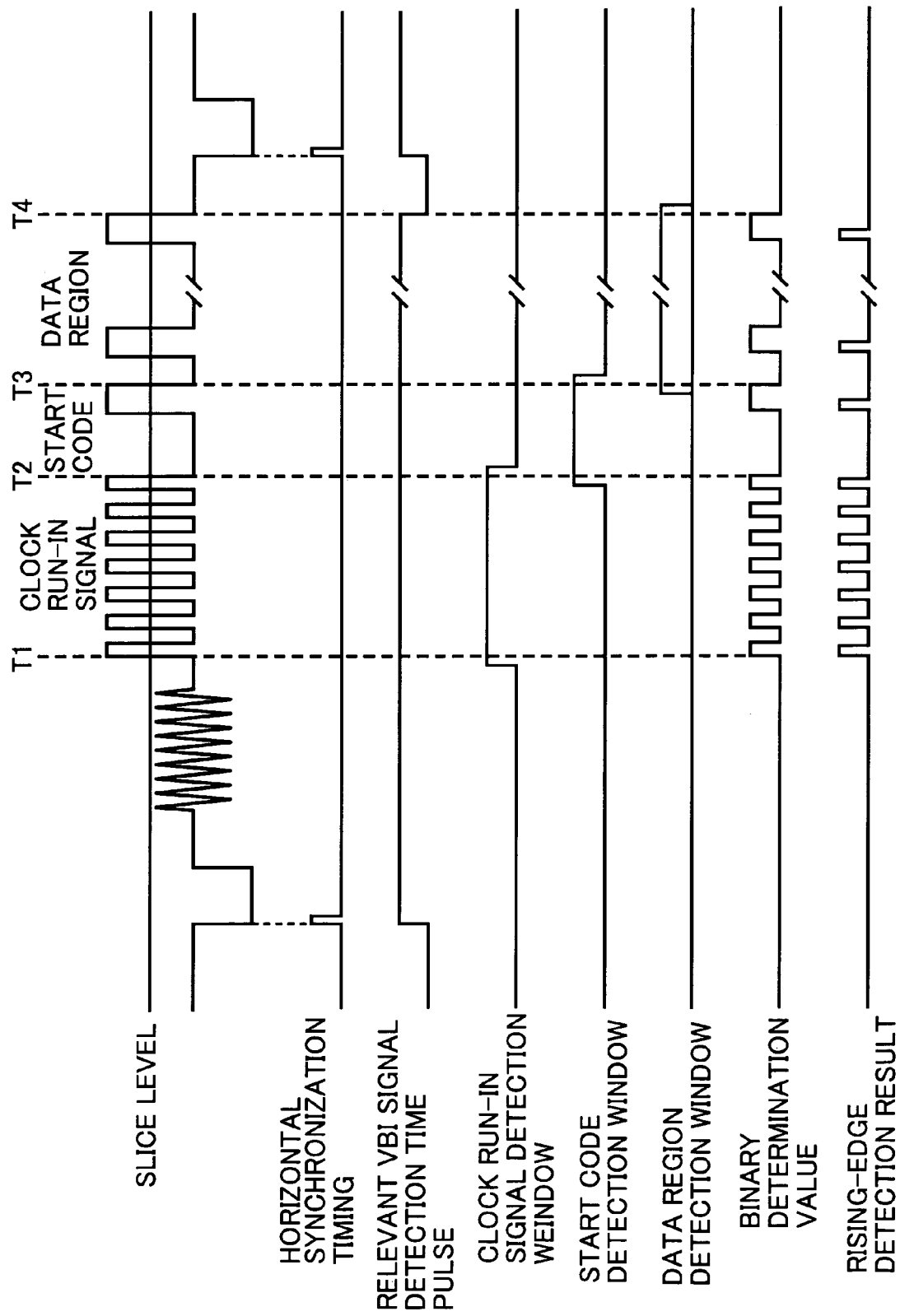
FIG. 22 is a timing chart for closed caption signal input.

FIG. 22 shows a timing chart of when a closed caption signal is inputted as a video signal, and the processing from the first embodiment through the fifth embodiment is carried out. The window generation circuits of FIG. 3, by using the system clock (not shown in the figure) as a reference, make it possible to confirm a timing and length of a time-period window a H (high) output is being carried out. The clock run-in signal detection window output by window generation circuit 9 is outputting H during a time-period, which has been provided with an appropriate margin, relative to a time-period (T1 through T2) where there are clock run-in signal's of a closed caption signal. Further, the start code detection window output by window generation circuit 7 is outputting H during a time-period, which has been provided with an appropriate margin, relative to a time-period (T2 through T3) where there is a start code of a closed caption signal. Similarly, the data region detection window output by window generation circuit 8 outputs H during a time-period, which has been provided with an appropriate margin, relative to a time-period (T3 through T4) where there is a data region of a closed caption signal.

A binary determination value is generated based on a slice level input from outside, and a rising-edge detection result for a binary determination value is output H at the change-points ("0"→"1") of the slice values detected in each of the above window.

Figure 23A:
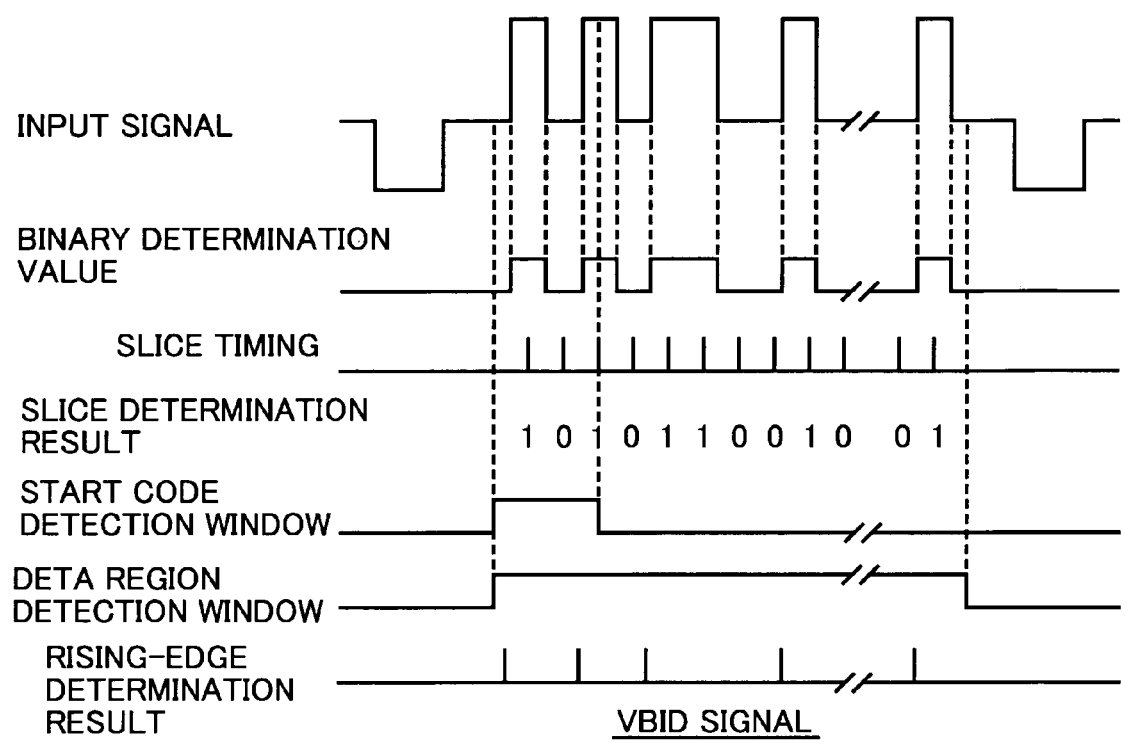
FIG. 23A is the results of implementing false-positive detection prevention in a false-positive detection prevention circuit of this embodiment when a VBID signal was input.
Figure 23B:
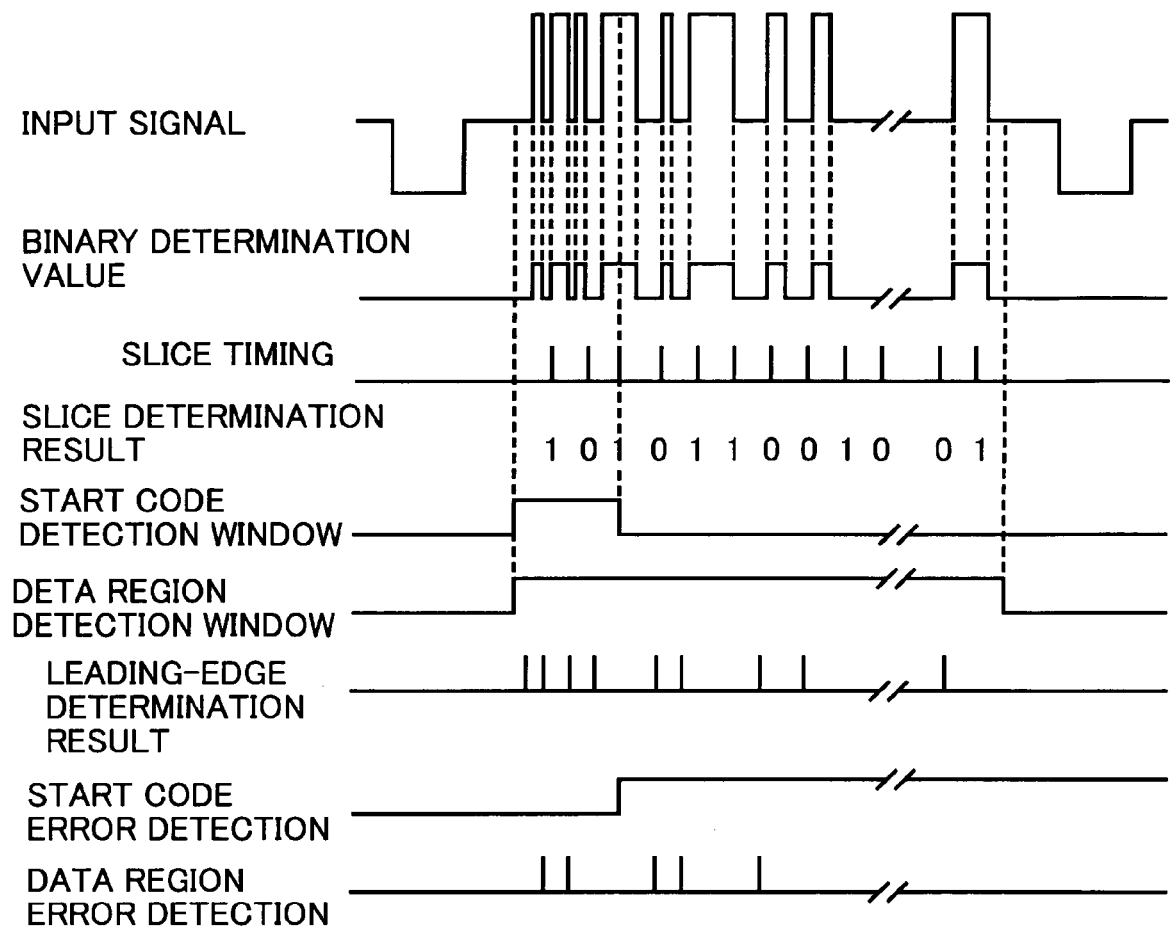
FIG. 23B is the results when a signal determined to be an error was input.

FIGS. 23A, 23B show the results of carrying out false-positive detection prevention in a false-positive detection prevention circuit of this embodiment. FIG. 23A shows the results when a VBID signal was input, and FIG. 23B shows the results when a signal, which was determined to be an error, was input.

Figure 27A:
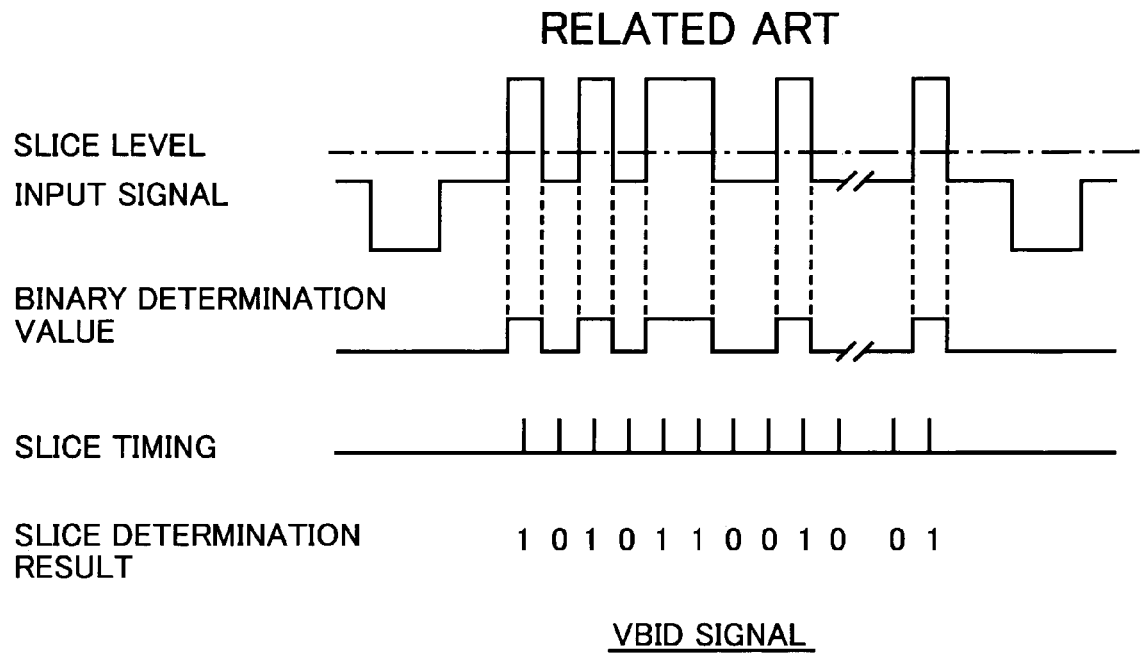
FIG. 27A is the results of implementing false-positive detection prevention in a conventional false-positive detection prevention circuit when a VBID signal was input.

FIG. 23A, similar to FIG. 27A, shows favorable results, where the slice determination result represents VBI signal. The rising-edge determination result is also favorable in that binary determination value change-points corresponding to "1"→"1" were detected in the start code detection window and data region detection window.

Figure 27B:
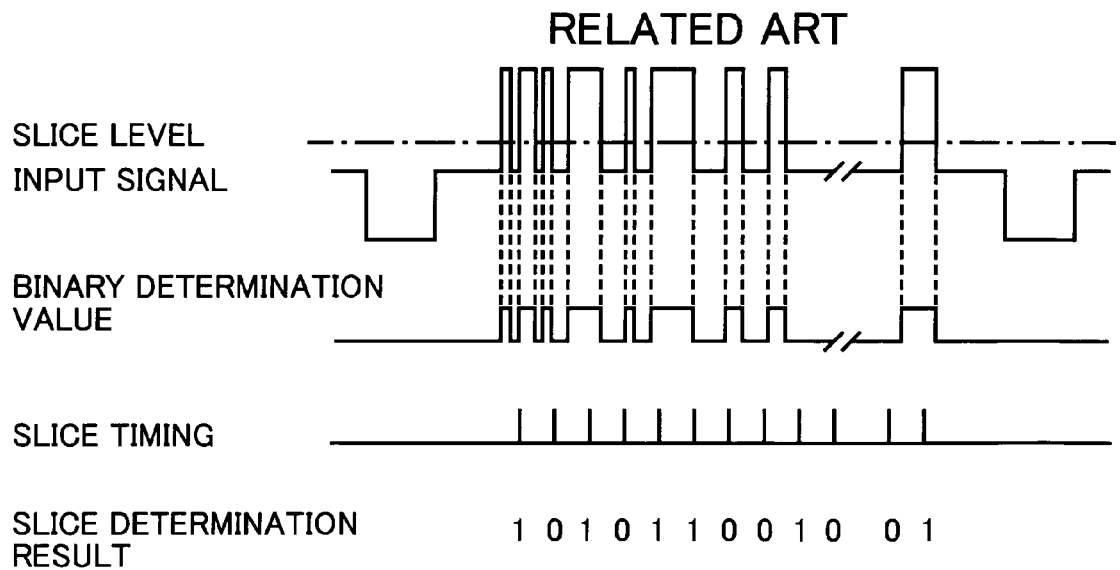
FIG. 27B is the results when a signal not determined to be an error was input.

In FIG. 23B, similar to FIG. 27B, without being able to detect the change-point of a binary determination value between a certain sampling position and the sampling position adjacent thereto based on a determination according to only a slice determination result, the determination results became the same as those of FIG. 23A, and an error signal was not output. However, in the rising-edge determination result, binary determination value of change-points corresponding to "0"→"1" between the sampling positions were detected in the start code detection window and the data region detection window when compared with those of FIG. 23A. As a result, the start code detection circuit 10 outputs H in the start code determination as the error detection thereof, and the data-part error detection circuit 12 outputs H by treating the change-point that exists only in FIG. 23B as a data region's error detection. The error determination circuit 15 outputs an error signal based on these H outputs, thereby making it possible to prevent a false-positive detection.

Furthermore, the above-described aspect is one example for carrying out the present invention, and the present invention is not limited to this. Therefore, it is possible to make various modifications within a scope that does not alter the gist of the present invention.

For example, in the above explanations, a count was carried out with reference to the system clock while referring to either the width or periods of a pulse of a binary determination value related to a start code and clock run-in signal, but a dedicated clock can be provided for counting width, periods and so forth.

Further, in the embodiments, margins were set for windows generated by window generation circuits, and for H (L) continuity determinations in the start code detection circuit 10, but the present invention is not limited to this. Margin setting itself can be done by increasing the upper limit values and decreasing the lower limit values input to the comparator W2, comparator Hk (3) (Lk (3)) (k=1, 2, ...) and so forth. Consequently, margins can be set for values that can alter these upper limit and lower limit values for each comparator.

Further, the Fifth Embodiment adopted a constitution for detecting a first rising-edge position at which a binary determination value is initially changed from "0"→"1", but, by contrast, a constitution for detecting a first falling-edge position at which a binary determination value is initially changed from "1"→"0" can also be adopted. Further, it is possible to adopt a constitution, which not only detects either a first rising-edge position or a first falling-edge position, but also is capable of detecting either an nth rising-edge position or an nth falling-edge position.

It is apparent that the present invention is not limited to the above embodiment and it may be modified and changed without departing from the scope and spirit of the invention.

What is claimed is:

1. A false-positive detection prevention circuit comprising:
   an identification code detection circuit for detecting an identification code of a binary determination value generated by slicing a multiplexed signal, evaluating the identification code, and outputting the detection result;
   and error determination circuit for making a error determination based on the detection result;
   wherein the identification code evaluation makes reference to at least one of the parameters including a pulse width, a pulse period and initial edge position of the binary determination value related to the identification code.

2. The false-positive detection prevention circuit in accordance with claim 1, wherein:
   the identification code is a clock run-in signal;
   the identification code detection circuit is a clock run-in signal detection circuit for detecting and evaluating the clock run-in signal; and
   the pulse period of the binary determination value is a binary determination value related to the clock run-in signal.

3. The false-positive detection prevention circuit in accordance with claim 2, further comprising:
   a rising edge (falling edge) detection circuit for detecting a rising edge or falling edge of the binary determination, wherein
   the rising/falling-edge detection circuit comprises a rising/falling pulse counter for counting a rising edge or falling edge of the clock run-in signal and a period detection counter for counting a period of the clock run-in signal.

4. The false-positive detection prevention circuit in accordance with claim 3, wherein
   the period detection counter determines a reset timing for counting the period of the clock run-in signal based on the rising/falling-edge pulse output from the rising/falling-edge detection circuit.

5. The false-positive detection prevention circuit in accordance with claim 3, wherein
   a margin is set for a count value range regarding the determination result for the number of rising/falling edge as OK.

6. The false-positive detection prevention circuit in accordance with claim 3, wherein
the period detection counter sets a margin for a count value range regarding the period determination result as OK.

7. The false-positive detection prevention circuit in accordance with claim 3, further comprising:
a second window generation circuit for generating a clock run-in signal detection window for extracting the clock run-in signal of the binary determination value.

8. The false-positive detection prevention circuit in accordance with claim 7, wherein
a horizontal synchronization timing determines reset timing when the second window generation circuit generates the second window.

9. The false-positive detection prevention circuit in accordance with claim 7, wherein
a margin is set for the clock run-in signal detection window.

10. The false-positive detection prevention circuit in accordance with claim 1, wherein:
the identification code is in data part;
the identification code detection circuit detecting the data part and evaluating the detected data part;
further comprising:
a rising/falling-edge detection circuit for detecting a rising edge or falling edge of the binary detection value and outputting a rising edge pulse or falling edge pulse, wherein the rising/falling-edge detection circuit includes a interval, detection counter for counting a interval of rising edges or falling edges of the data part based on the rising edge pulse or falling edge pulse.

11. The false-positive detection prevention circuit in accordance with claim 10, wherein
the interval detection counter determines reset timing when counting the interval of rising edges or falling edges of the data part with reference to a system clock based on a rising edge pulse or a falling edge pulse output from the rising/falling-edge detection circuit.

12. The false-positive detection prevention circuit in accordance with claim 10, wherein
a margin is set for a count value range regarding the interval determination result as OK.

13. The false-positive detection prevention circuit in accordance with claim 10, further comprising:
a third window generation circuit for generating a data part error detection window for extracting the data part of the binary determination value.

14. The false-positive detection prevention circuit in accordance with claim 10, wherein
a horizontal synchronization timing determines reset timing when the third window generation circuit generates the third window.

15. The false-positive detection prevention circuit in accordance with claim 10, wherein
a margin is set for the data part error detection window detection window.

16. The false-positive detection prevention circuit in accordance with claim 1, wherein
the multiplexed signal is Vertical Blanking Interval signal.

17. A false-positive detection prevention circuit, which inputs a multiplexed signal-sliced binary determination value, has an identification code detection circuit for detecting the identification code of the binary determination value, and evaluating the identification code, carries out error determination for the identification code evaluation, and outputs a signal that does not correspond to the signal as an error signal, wherein the identification code evaluation carried out by the identification code detection circuit makes reference to at least one of the parameters including a pulse width, a pulse period and initial edge position of the binary determination value related to the identification code.

18. The false-positive detection prevention circuit in accordance with claim 17, wherein the pulse width of the binary determination value is measured by performing a count using a specific clock as a reference signal.

19. The false-positive detection prevention circuit in accordance with claim 17, wherein:
the identification code is a start code;
the identification code detection circuit is a start code detection circuit for detecting and evaluating the start code; and
the pulse width of the binary determination value is determined by a continuity of a binary determination value related to the start code.

20. The false-positive detection prevention circuit in accordance with claim 19, wherein
the start code detection circuit has a continuity detection circuit for setting the detection range with one or more continuity for the start code.

21. The false-positive detection prevention circuit in accordance with claim 20, wherein
the continuity detection circuit has a rising/falling-edge detection circuit for detecting the rising-edge or the falling-edge of a binary determination value, and outputting a rising-edge pulse or a falling-edge pulse, and
a rising-edge pulse or falling-edge pulse output by the rising/falling-edge detection circuit is used for reset timing by counting binary determination value continuity.

22. The false-positive detection prevention circuit in accordance with claim 20, wherein
a margin is set for a count value range regarding the continuity determination result as OK.

23. The false-positive detection prevention circuit in accordance with claim 19, comprising:
a first window generation circuit for generating a start code detection window for extracting the start code of the binary determination value.

24. The false-positive detection prevention circuit in accordance with claim 23, wherein
a horizontal synchronization timing determines reset timing when the first window generation circuit generates the first window.

25. The false-positive detection prevention circuit in accordance with claim 23, wherein
a margin is set for the start code detection window.

26. A false-positive detection prevention circuit, which inputs a multiplexed signal-sliced binary determination value, has an identification code detection circuit for detecting the identification code of the binary determination value, and evaluating the identification code, carries out error determination for the identification code evaluation, and outputs a signal that does not correspond to the signal as an error signal, wherein the identification code evaluation carried out by the identification code detection circuit makes reference to the rising/falling-edge position at which the binary determination value initially changes related to the identification code in each field.

27. The false-positive detection prevention circuit in accordance with claim 26, wherein the rising/falling-edge position of the binary determination value is measured by performing a count using a specific clock as a reference signal.

28. The false-positive detection prevention circuit in accordance with claim 26, wherein:

the identification code is a pulse of a binary determination value related to the position of the rising/falling-edge;

the identification code detection circuit is a rising/falling-edge position detection circuit for detecting and evaluating the position of the rising edge or the falling edge based on a difference between a count value of a first field and a count value of a second field which is prior to the first field.

29. The false-positive detection prevention circuit in accordance with claim 26, wherein a horizontal synchronization timing determines reset timing when the rising/falling-edge position detection circuit generates the rising/falling-edge position.

30. The false-positive detection prevention circuit in accordance with claim 26, wherein a margin is set for a count value range regarding the difference determination result as OK.

* * * * *